(12) United States Patent
Ogawa et al.

(10) Patent No.: US 8,919,865 B2
(45) Date of Patent: Dec. 30, 2014

(54) VEHICLE REAR BODY STRUCTURE

(71) Applicant: Honda Motor Co., Ltd, Tokyo (JP)

(72) Inventors: Masayuki Ogawa, Wako (JP); Takenobu Haga, Wako (JP); Yoshihiro Kobayashi, Wako (JP); Itsuo Kimura, Wako (JP); Kazutaka Kanezashi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/023,627

(22) Filed: Sep. 11, 2013

(65) Prior Publication Data

US 2014/0070566 A1    Mar. 13, 2014

(30) Foreign Application Priority Data

Sep. 12, 2012  (JP) ................. 2012-200680

(51) Int. Cl.
*B62D 25/08* (2006.01)
(52) U.S. Cl.
CPC .............. *B62D 25/08* (2013.01); *B62D 25/087* (2013.01)
USPC .................................................. 296/187.11
(58) Field of Classification Search
CPC .. B62D 25/087; B62D 25/2027; B62D 25/08; B62D 21/152; B60K 1/04; B60K 1/00; B60K 2001/0416; B60N 2/3075; B60Y 2200/92; B60Y 2306/01; B60Y 2400/61
USPC ............. 296/204.04, 187.11, 187.03, 183.08, 296/204, 203.04
See application file for complete search history.

(56) References Cited

U.S. PATENT DOCUMENTS

| 7,568,755 B2* | 8/2009 | Imada et al. ............. 296/187.11 |
| 7,690,686 B2* | 4/2010 | Hashimura et al. ........... 280/782 |

FOREIGN PATENT DOCUMENTS

| JP | 2005-324771 A | 11/2005 |
| JP | 2009-274665 A | 11/2009 |

* cited by examiner

*Primary Examiner* — Joseph D Pape
*Assistant Examiner* — Dana Ivey
(74) *Attorney, Agent, or Firm* — Westerman, Hattori, Daniels & Adrian, LLP

(57) ABSTRACT

A vehicle rear body structure is provided in a vehicle that includes an electrical component box. The vehicle rear body structure includes a rear frame, a protective frame that is positioned on a rear side of the electrical component box and stands erect on the upper surface of the rear frame, a wheel housing reinforcing gusset that includes an engagement pin that protrudes rearward from the rear surface thereof, and an upper load transmitting member that extends forward from the upper end portion of the protective frame to the wheel housing reinforcing gusset. In the vehicle rear body structure, the upper load transmitting member has a positioning hole with which the engagement pin is engaged and includes a fastening extension fastened to the inner side surface of the wheel housing reinforcing gusset.

18 Claims, 17 Drawing Sheets

VEHICLE REAR BODY STRUCTURE

CROSS REFERENCES TO RELATED APPLICATIONS

The present application claims priority under 35 U.S.C. §119 to Japanese Patent Application No. 2012-200680, filed Sep. 12, 2012, entitled "Vehicle Rear Body Structure." The contents of this application are incorporated herein by reference in their entirety.

TECHNICAL FIELD

The present disclosure relates to a vehicle rear body structure of an automobile.

BACKGROUND

Some automobiles such as electric automobiles and hybrid automobiles are equipped with power units disposed in their luggage compartments on the rear portions thereof. For an automobile equipped with a power unit, there is a technology in which the power unit is entirely surrounded by a frame unit that has a plurality of frames so as to prevent direct application of external forces to the power unit even when external forces are applied to a vehicle (For example, Japanese Unexamined Patent Application Publication No. 2009-274665).

There also is a technology in which an electrical component box is provided on a rear side of a seat back of a rear seat and a cooling device that cools the electrical component box is disposed between the electrical component box and a vehicle body side wall (for example, Japanese Unexamined Patent Application Publication No. 2005-324771).

SUMMARY

When the power unit is entirely surrounded by the frame unit as described in Japanese Unexamined Patent Application Publication No. 2009-274665, the volume of the luggage compartment is decreased. In the case where the electrical component box, to which other devices are connected, needs to be protected as described in Japanese Unexamined Patent Application Publication No. 2005-324771, a protective structure of the electrical component box needs to be disposed while avoiding interference with the other devices. This may lead to a decrease in the volume of the luggage compartment depending on the arrangement.

The inventors of the present disclosure found the following. When an electrical component box is disposed in a luggage compartment at the rear of a vehicle, the electrical component box needs to be protected particularly against shocks caused by a rear-end collision, in which a vehicle is hit by another vehicle from behind. For example, it is assumed that a vehicle is involved in a rear-end collision, in which a vehicle 500 crashes into the rear surface of a vehicle in front as illustrated in FIG. 17. Here, in this vehicle, a rear bumper beam 503 extends in the vehicle width direction so as to connect to each other rear bumper beam extensions 502 provided at rear end portions of left and right rear frames 501. Due to the rear-end collision, when a load is applied to the rear bumper beam 503 at a position above the center in an area where the rear bumper beam 503 is attached, the rear bumper beam extensions 502 may be removed from the rear frames 501. In this case, as indicated by two-dot chain line in FIG. 17, the rear bumper beam 503 may be pushed by the vehicle 500 that collides with this vehicle, moved forward, and collide with an electrical component box 504. The electrical component box 504 needs to be protected against a collision occurring in such a way. Furthermore, it is not desirable that the volume of the luggage compartment be decreased due to the protection of the electrical component box as described above. The decrease in the volume of the luggage compartment needs to be avoided as much as possible.

Accordingly, the present application describes a vehicle rear body structure, with which the electrical component box can be protected and a decrease in the volume of the luggage compartment can be suppressed.

According to a first aspect, a vehicle rear body structure, which is provided in a vehicle that includes an electrical component box (for example, electrical component box 26 of the embodiment), includes a rear frame (for example, rear frame 14 of the embodiment) that has an upper surface and an inner side surface and a protective frame (for example, protective frame 42 of the embodiment) that has an upper end portion, is positioned on a rear side of the electrical component box, and stands erect on the upper surface of the rear frame. The vehicle rear body structure also includes a wheel housing reinforcing gusset (for example, wheel housing reinforcing gusset 191 of the embodiment) that has a rear surface and an inner side surface and includes an engagement pin (for example, engagement pin 195 of the embodiment) that protrudes rearward from the rear surface thereof and an upper load transmitting member (for example, upper load transmitting member 43 of the embodiment) that extends forward from the upper end portion of the protective frame to the wheel housing reinforcing gusset. In the vehicle rear body structure, the upper load transmitting member has a positioning hole (for example, positioning hole 146 of the embodiment) with which the engagement pin is engaged and includes a fastening extension (for example, fastening extension 137 of the embodiment) fastened to the inner side surface of the wheel housing reinforcing gusset.

Thus, in the case of a rear-end collision, when, for example, the rear bumper beam is moved forward, the rear bumper beam is brought into contact with the protective frame before it is brought into contact with the electrical component box. The protective frame stands erect on the upper surface of the rear frame and the upper load transmitting member extends from the upper end portion of the protective frame to the wheel housing reinforcing gusset. Thus, a load received by the protective frame is transmitted by the rear frame at the lower portion and by the upper load transmitting member at the upper portion. Accordingly, a load from the rear bumper beam is received by the protective frame in a desirable manner. This can suppress input of load to the electrical component box positioned on the front side of the protective frame. As described above, the electrical component box is protected by the protective frame that stands erect on the rear frame and the upper load transmitting member that extends forward from the upper end portion of the protective frame to the wheel housing reinforcing gusset. This allows a decrease in the volume of the luggage compartment to be suppressed and the electrical component box to be protected. Furthermore, the engagement pin, which protrudes rearward from the rear surface of the wheel housing reinforcing gusset, is engaged with the positioning hole of the upper load transmitting member, and the fastening extension of the upper load transmitting member is fastened to the inner side surface of the wheel housing reinforcing gusset. Thus, attachment operation of the upper load transmitting member can be performed from the luggage compartment or the vehicle cabin. This improves work efficiency in attaching the upper load transmitting member. The engagement pin, which protrudes rearward from the rear surface of the wheel housing reinforcing gusset, is engaged with the positioning hole of the upper load transmitting member. Thus, a load can be stably transmitted from the upper load transmitting member to the wheel housing reinforcing gusset.

Preferably, the protective frame includes a protective frame main body (for example, protective frame main body 51 of the embodiment) that has a lower end portion having a peripheral edge and that extends in an up-down direction, a base member (for example, base member 52 of the embodiment) that has an upper surface, to which the lower end portion of the protective frame main body is butt welded, and a reinforcing member (for example, reinforcing member 53, 54 of the embodiment) connected to the peripheral edge of the lower end portion of the protective frame main body such that the reinforcing member surrounds the peripheral edge of the lower end portion of the protective frame main body.

Thus, a load transmitted to the lower portion can be reliably transmitted from the protective frame to the rear frame.

Preferably, the protective frame includes a rear frame upper surface fastening seat (for example, fastening seat 105 of the embodiment) that is fastened to the upper surface of the rear frame and a rear frame inner side surface fastening seat (for example, fastening seat 94, 115 of the embodiment) that is fastened to the inner side surface of the rear frame.

Thus, fastening work is facilitated, and the protective frame can be reliably fastened to the rear frame. Accordingly, a load transmitted to the lower portion can be stably transmitted from the protective frame to the rear frame.

Preferably, the vehicle rear body structure further includes an attachment stiffener (for example, attachment stiffener 171 of the embodiment) disposed in the rear frame, opposite to the rear frame upper surface fastening seat with the rear frame clamped therebetween, and opposite to the rear frame inner side surface fastening seat with the rear frame clamped therebetween.

Thus, the protective frame can be reliably fastened to the rear frame. Accordingly, a load transmitted to the lower portion can be more reliably transmitted from the protective frame to the rear frame.

Preferably, the vehicle rear body structure further includes a box frame (for example, box frame 215 of the embodiment) that supports the electrical component box, and the protective frame includes an attachment seat (for example, attachment seat 93 of the embodiment) to which the box frame is attached.

Thus, a load applied to the box frame can be transmitted to the rear frame, and a separate bracket having an attachment seat is not needed.

Preferably, the vehicle rear body structure further includes a box frame that supports the electrical component box and an inclined frame (for example, inclined frame 45 of the embodiment) that has an end portion and connects the upper end portion of the protective frame to the box frame, and the protective frame, the box frame, and the inclined frame form a truss structure in a vehicle width direction.

Thus, inward or outward inclination of the protective frame in the vehicle width direction can be suppressed with a small sized structure.

Preferably, the protective frame has a recess (for example, recess 81 of the embodiment) at the upper end portion thereof, and the end portion of the inclined frame is disposed in the recess.

Thus, protrusion of the inclined frame to the luggage compartment can be suppressed, and accordingly, a decrease in the volume of the luggage compartment can be suppressed.

According to a second aspect, a vehicle rear body structure provided in a vehicle that includes a rear seat, an electrical component box having a rear surface, a wheel housing, and a luggage compartment having a front portion. The vehicle rear body structure includes a rear frame having an upper surface, a cross member (for example, rear cross member 212 of the embodiment), a wheel housing reinforcing gusset and a box frame, on which the electrical component box is disposed. The box frame includes a box lateral member (for example, box lateral member 211 of the embodiment) that has an end portion and is disposed on an inner side of the rear frame in a vehicle width direction on a rear side of the rear seat in the front portion of the luggage compartment and a box longitudinal member (for example, box longitudinal member 214 of the embodiment) disposed in a vehicle body front-rear direction between the box lateral member and the cross member disposed on a front side of the box lateral member. The vehicle rear body structure also includes a protective frame that has an upper end portion having a front surface, is positioned on a rear side of the electrical component box, and stands erect on the upper surface of the rear frame, an upper load transmitting member that extends forward from the upper end portion of the protective frame to the wheel housing reinforcing gusset, and a reinforcing stiffener (for example, reinforcing stiffener 38 of the embodiment) provided on the rear surface of the electrical component box.

Thus, in the case of a rear-end collision, for example, when the rear bumper beam is not bent and moved forward, the rear bumper beam is brought into contact with the protective frame before it is brought into contact with the electrical component box. The protective frame stands erect on the upper surface of the rear frame and the upper load transmitting member extends from the upper end portion of the protective frame to the wheel housing reinforcing gusset. Thus, a load received by the protective frame is transmitted by the rear frame to the lower portion and by the upper load transmitting member to the upper portion. Accordingly, a load from the rear bumper beam is received by the protective frame in a desirable manner. This can suppress input of load to the electrical component box positioned on the front side of the protective frame. As described above, the electrical component box is protected by the protective frame that stands erect on the rear frame and the upper load transmitting member that extends forward from the upper end portion of the protective frame to the wheel housing reinforcing gusset. This allows a decrease in the volume of the luggage compartment to be suppressed and the electrical component box to be protected. Furthermore, even when the rear bumper beam is bent, the rear bumper beam can be received by the reinforcing stiffeners provided on the rear surface of the electrical component box. Thus, the electrical component box can be protected. The electrical component box is disposed on the box frame, which has a box lateral member and the box longitudinal member. The box lateral member is provided in the vehicle width direction in the front portion of the luggage compartment on the rear side of the rear seat. The box longitudinal member is provided between the box lateral member and the cross member on the front side. Thus, the electrical component box can be disposed in the most front portion of the luggage compartment. This allows the volume of the luggage compartment to be increased.

Preferably, in the vehicle rear body structure, the rear frame and the wheel housing form a corner portion, the wheel housing reinforcing gusset has a closed section with the wheel housing, and the wheel housing reinforcing gusset extends to the corner portion. The wheel housing reinforcing gusset includes upper and lower gussets (for example, upper gusset 192 and lower gusset 193 of the embodiment) that are overlapped with each other so as to form a overlapped portion (for example, overlapped portion 194 of the embodiment) having a rear surface and a fastening portion (for example, fastening portion 201 of the embodiment), and an engagement pin disposed in the overlapped portion such that the engagement pin protrudes rearward from the rear surface of the overlapped portion. In this case, the upper load transmitting member includes a fastening extension fastened to the fastening portion of the overlapped portion and has a positioning hole with which the engagement pin is engaged.

Thus, the wheel housing reinforcing gusset together with the wheel housing has a closed section and extends to a corner portion formed by the rear frame and the wheel housing. Thus, the strength of the wheel housing reinforcing gusset is improved. Furthermore, the engagement pin, which protrudes rearward from the rear surface of the wheel housing reinforcing gusset, is engaged with the positioning hole of the upper load transmitting member, and the fastening extension of the upper load transmitting member is fastened to the fastening portion of the wheel housing reinforcing gusset. Thus, attachment operation of the upper load transmitting member can be performed from the luggage compartment side or the vehicle cabin side. This improves work efficiency in attaching the upper load transmitting member. The engagement pin that protrudes rearward from the overlapped portion is engaged with the positioning hole of the upper load transmitting member. The upper and lower gussets of the wheel housing reinforcing gusset are overlapped with each other in the overlapped portion and the overlapped portion has a high strength. In addition, the fastening extension is fastened to the overlapped portion, where the upper and lower gussets are overlapped with each other and which has a high strength. Thus, a load can be stably transmitted from the upper load transmitting member to the wheel housing reinforcing gusset.

Preferably, the protective frame has a hollow frame structure, and the upper load transmitting member has a hollow frame structure and includes an upper load transmitting member main body (for example, upper load transmitting member main body 121 of the embodiment) that has one and the other end portions. The one end portion is connected to the front surface of the upper end portion of the protective frame. The upper load transmitting member also includes a lid member (for example, lid member 123 of the embodiment) provided at the other end portion of the upper load transmitting member main body. The positioning hole is formed in the lid member, which is connected to the fastening extension.

Thus, a load can be stably transmitted from the upper load transmitting member to the wheel housing reinforcing gusset.

Preferably, the box lateral member has a closed section, includes a collar (for example, collar 236 of the embodiment) at the end portion thereof, and is fastened to the rear frame with the collar clamped therebetween.

Thus, the strength of the box lateral member can be improved because of its closed sectional structure. Furthermore, the box lateral member is fastened to the rear frame with the collar clamped therebetween. Thus, the fastening strength can be improved. In the above explanation, specific elements with their reference numerals are indicated by using brackets. These specific elements are presented as mere examples in order to facilitate understanding, and thus, should not be interpreted as limiting the accompanying claims.

BRIEF DESCRIPTION OF THE DRAWINGS

The advantages of the disclosure will become apparent in the following description taken in conjunction with the following drawings.

DETAILED DESCRIPTION

A vehicle rear body structure according to an embodiment of the present disclosure will be described with reference to the drawings. The vehicle rear body structure according to the present embodiment is used for four-wheel vehicles equipped with electric motors for running such as hybrid automobiles, electric automobiles, and fuel cell automobiles. In each drawing, "UP" indicates an upper direction and "FR" indicates the front in a vehicle running direction. In the following description, front, rear, left, and right are defined with reference to the vehicle running direction.

Figure 1:
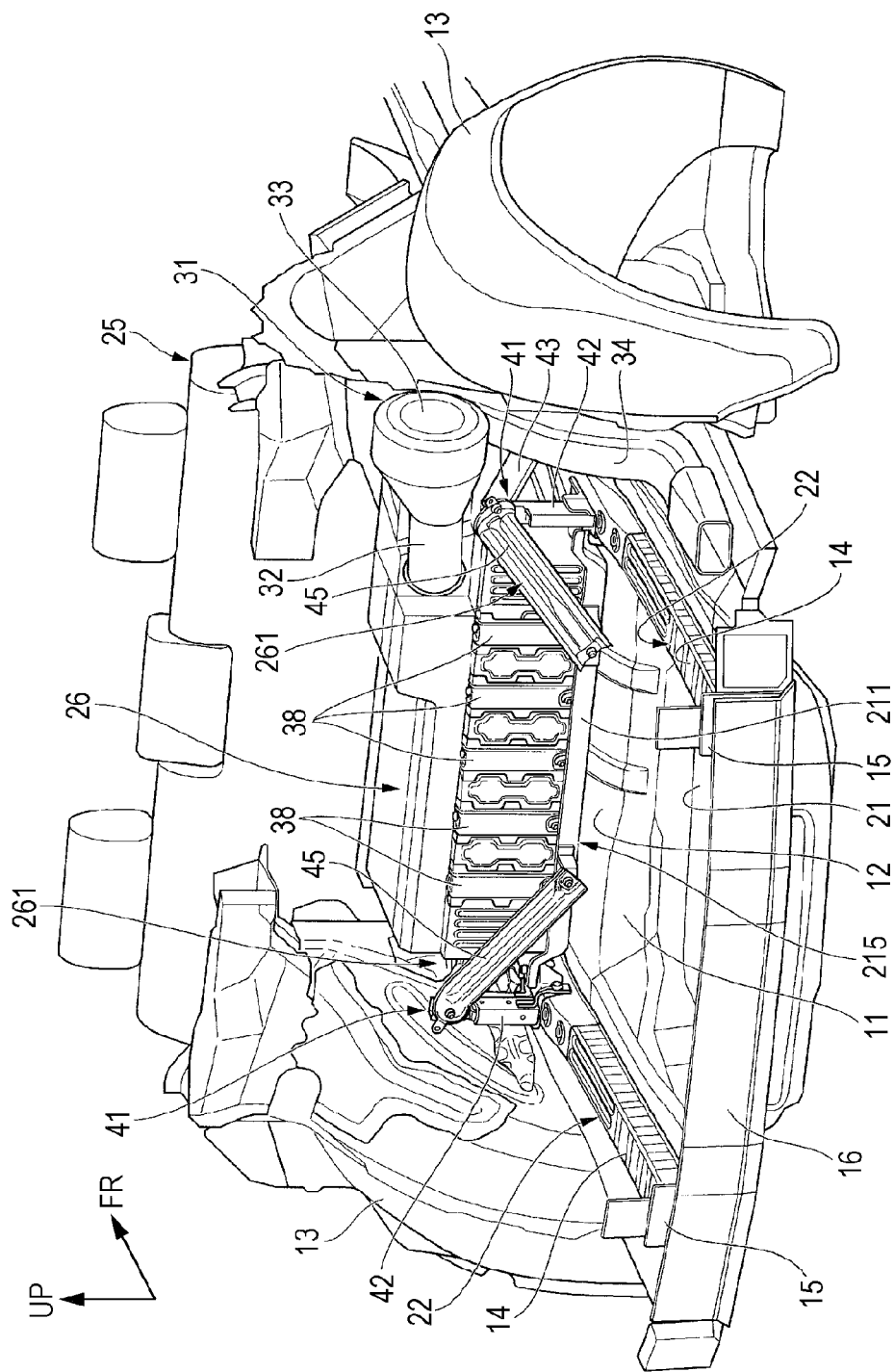
FIG. 1 is a perspective view of a vehicle rear body structure according to an embodiment showing the rear side.

As illustrated in FIG. 1, the vehicle rear body structure according to the present embodiment includes a rear floor panel 12, rear wheel housings 13, and a pair of left and right rear frames 14. The rear floor panel 12 defines a bottom surface of a luggage compartment 11. The rear wheel housings 13 are provided on both sides of the rear floor panel 12 in the vehicle width direction. The rear frames 14 extend in the front-rear direction on the rear floor panel 12. The vehicle rear body structure according to the present embodiment also includes a pair of left and right rear bumper beam extensions 15 and a rear bumper beam 16. The rear bumper beam extensions 15 are each connected to a rear end portion of a corresponding one of the pair of left and right rear frames 14. The rear bumper beam 16 extends in the vehicle width direction so as to connect the pair of left and right rear bumper beam extensions 15 to each other. A rear bumper face (not shown) is disposed on the rear side of the rear bumper beam 16 so as to cover the rear bumper beam 16.

A central portion of the rear floor panel 12, the central portion being in the center in the vehicle width direction, is recessed downward so as to form a storage recess 21, in which a spare tire or the like is stored. The pair of left and right rear frames 14 are disposed on both outer sides of the storage recess 21 in the vehicle width direction.

The pair of left and right rear frames 14 have a hat-shaped cross section and are joined to the rear floor panel 12, thereby forming a pair of left and right vehicle body frames 22 that each have a closed section with the rear floor panel 12. As is the case with the rear floor panel 12, the pair of left and right rear frames 14 are disposed at positions in the luggage compartment 11. Although it is not illustrated, the vehicle body frames 22 formed of these components are connected to a pair of left and right side sills that serve as vehicle body frames that extend in the vehicle front-rear direction at positions in a cabin at the front portion of the vehicle. These side sills are also connected to a pair of left and right front frames that serves as vehicle body frames that extend in the vehicle front-rear direction at positions in an engine compartment.

An electrical component box 26 used to feed power to a motor (not shown) for running the vehicle is disposed in a front portion of the luggage compartment 11 on the rear floor panel 12 on the rear side of a rear seat 25. The electrical component box 26 is an intelligent power unit (IPU), which supplies power to the motor for running the vehicle and also causes the motor to function as a power generator during deceleration and regeneration, thereby storing power generated by the motor. A battery that feeds and stores power, high-voltage system devices for controlling, and the like are contained in the electrical component box 26. The electrical component box 26 may be a battery box that mainly contains the battery.

A cooling device 31 is provided on one side, specifically on the right side, in the left-right direction in an upper portion of the electrical component box 26. The cooling device 31 includes a duct 32, a cooling fan 33, and a duct 34. The duct 32 is connected to an upper portion of a rear surface of the electrical component box 26 and extends outward in the vehicle width direction. The cooling fan is connected to a distal end of the duct 32. The duct 34 extends downward from the cooling fan 33 and then extends and opens at the rear end. The cooling fan 33 and the duct 34 are disposed further to the inside than the right rear wheel housing 13 in the vehicle width direction between the rear wheel housing 13 and the electrical component box 26. The cooling fan 33 sucks air in the electrical component box 26 through the duct 32 and exhausts the air into the luggage compartment 11 through the duct 34. Although it is not illustrated, the electrical component box 26 has an air inlet port that opens to the cabin. Air on the cabin side is introduced into the electrical component box 26 by a suction force caused by the cooling fan 33.

A plurality of, specifically five, reinforcing stiffeners 38 are provided on the rear surface of the electrical component box 26. These reinforcing stiffeners 38 are spaced apart from one another in the vehicle width direction.

A pair of left and right protective structures 41 are provided on the rear side on both sides of the electrical component box 26 in the vehicle width direction. The protective structures 41 each have a protective frame 42 that stands erect on an upper surface of a corresponding one of the rear frames 14 on the rear side of the electrical component box 26 so as to extend in the up-down direction. The structures of the protective structures 41 are line symmetric with each other about a line extending in the front-rear direction. Thus, in the following description, by using the left protective structure 41 as an example, the protective structures 41 are described in accordance with the posture in which the left protective structure 41 is attached to the vehicle.

Figure 2:
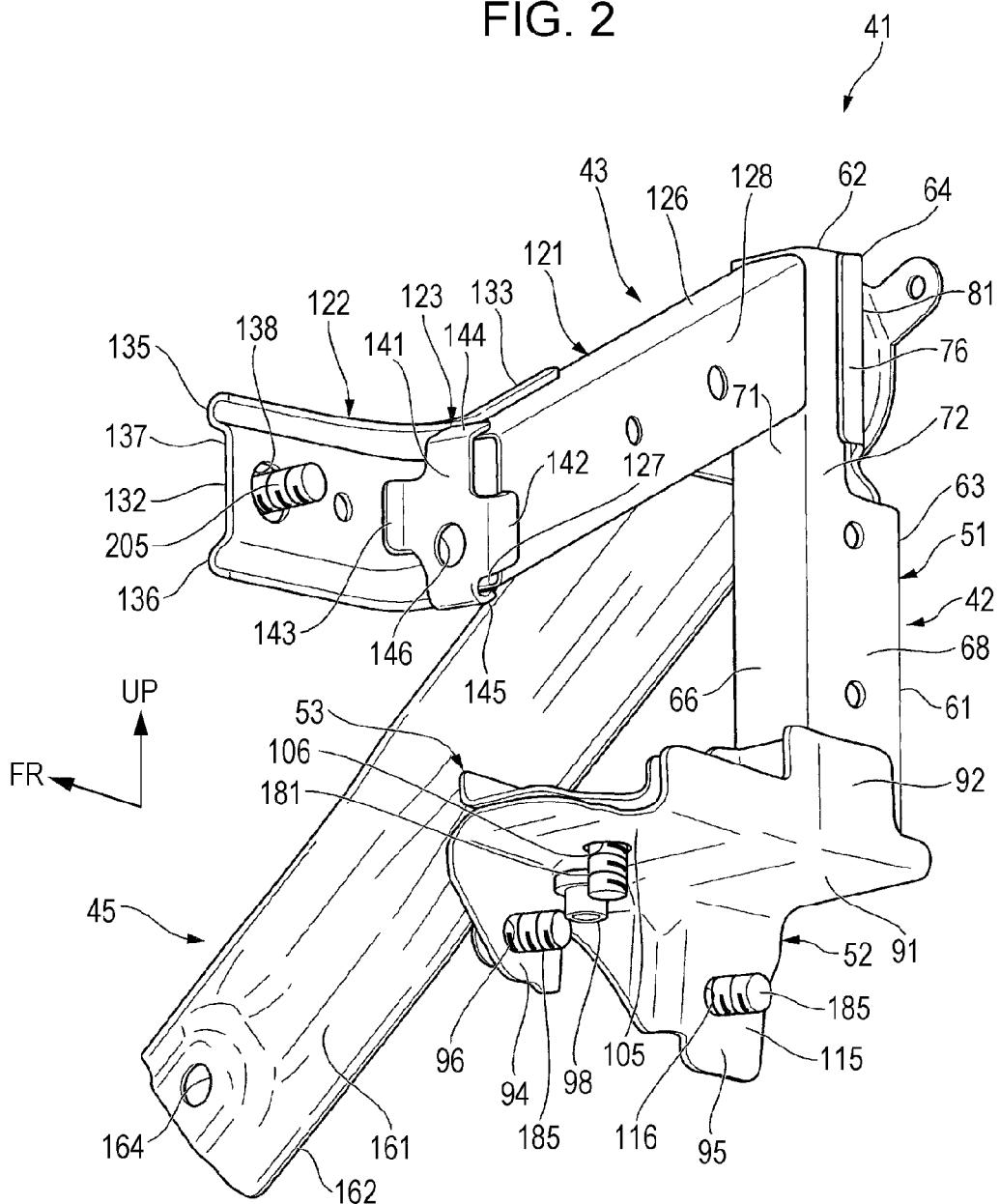
FIG. 2 is a perspective view of a protective structure of the vehicle rear body structure according to the embodiment.
Figure 3:
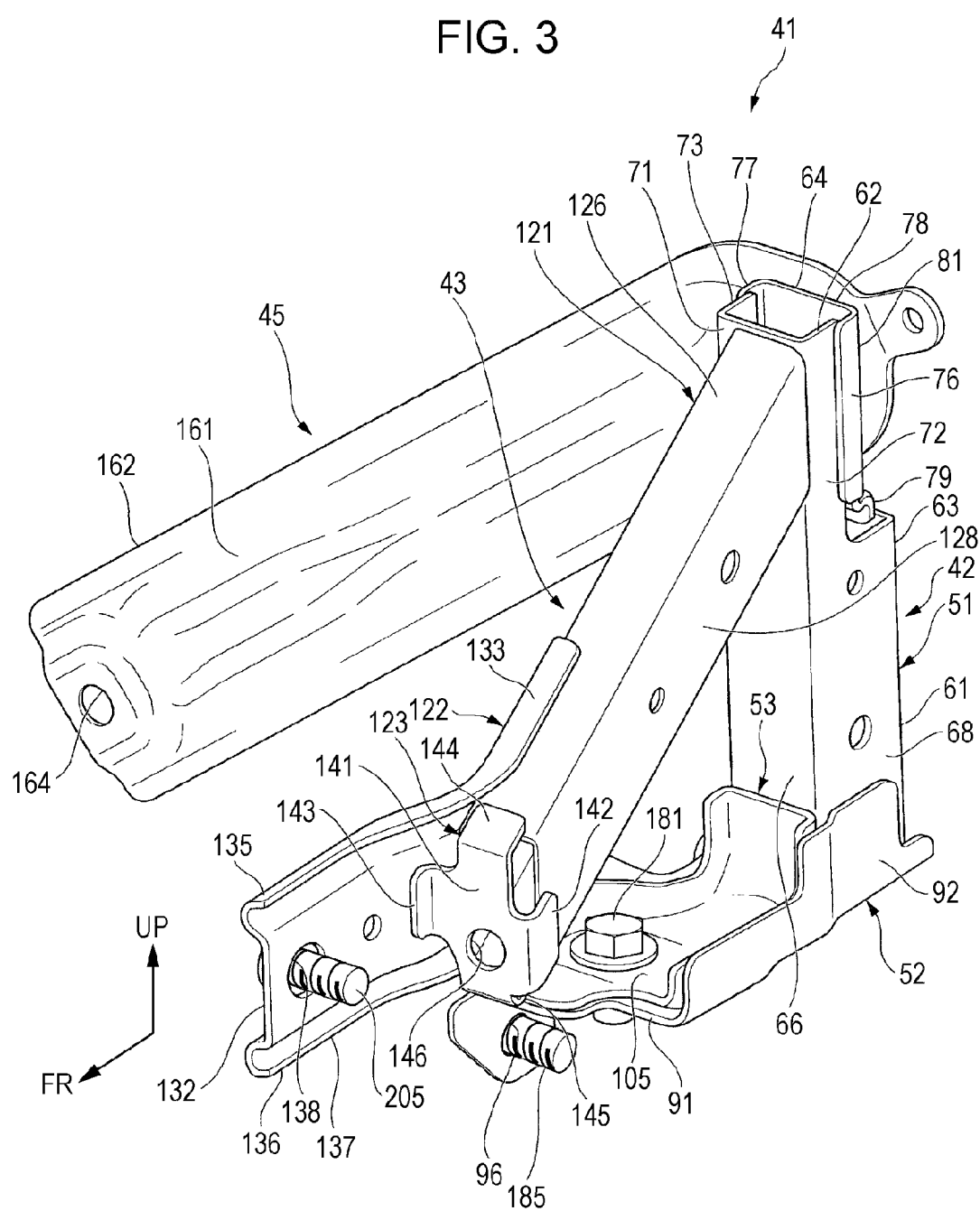
FIG. 3 is a perspective view of the protective structure of the vehicle rear body structure according to the embodiment.
Figure 4:
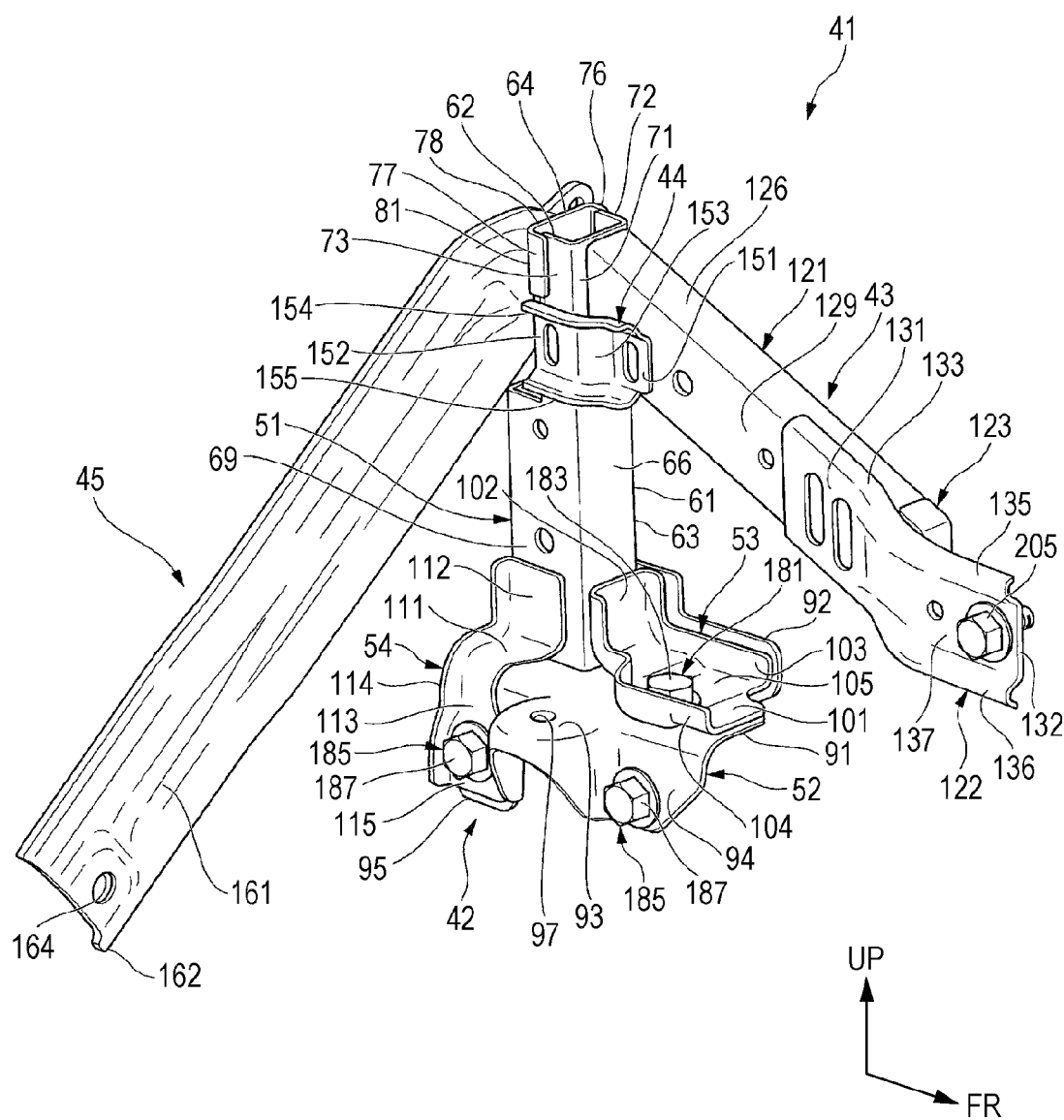
FIG. 4 is a perspective view of the protective structure of the vehicle rear body structure according to the embodiment.

As illustrated in FIGS. 2 to 4, the protective structure 41 includes the protective frame 42, an upper load transmitting member 43, a reinforcing member 44, and an inclined frame 45. The protective frame 42 extends in the up-down direction. The upper load transmitting member 43 extends forward from an upper end portion of the protective frame 42 and is slightly inclined downward. The reinforcing member 44 is, as illustrated in FIG. 4, joined to and straddle over both the protective frame 42 and the upper load transmitting member 43. As illustrated in FIGS. 2 to 4, the inclined frame 45 extends from the upper end portion of the protective frame 42 toward the inner side with respect to the vehicle width direction and is inclined downward.

The protective frame 42 includes a protective frame main body 51, a base member 52, and two reinforcing members 53 and 54. The protective frame main body 51 extends in the up-down direction. A lower end portion of the protective frame main body 51 is joined to an upper surface of the base member 52. The reinforcing members 53 and 54 are, as illustrated in FIG. 4, joined to the periphery of the lower end portion of the protective frame main body 51 so as to surround the lower end portion of the protective frame main body 51, and also joined to the base member 52.

As illustrated in FIGS. 2 to 4, the protective frame main body 51 includes a main member 63 and a cover member 64. The main member 63 is a single component that has an upper frame 62 and a lower frame 61. The cover member 64 is joined to the upper frame 62 of the main member 63.

Figure 5:
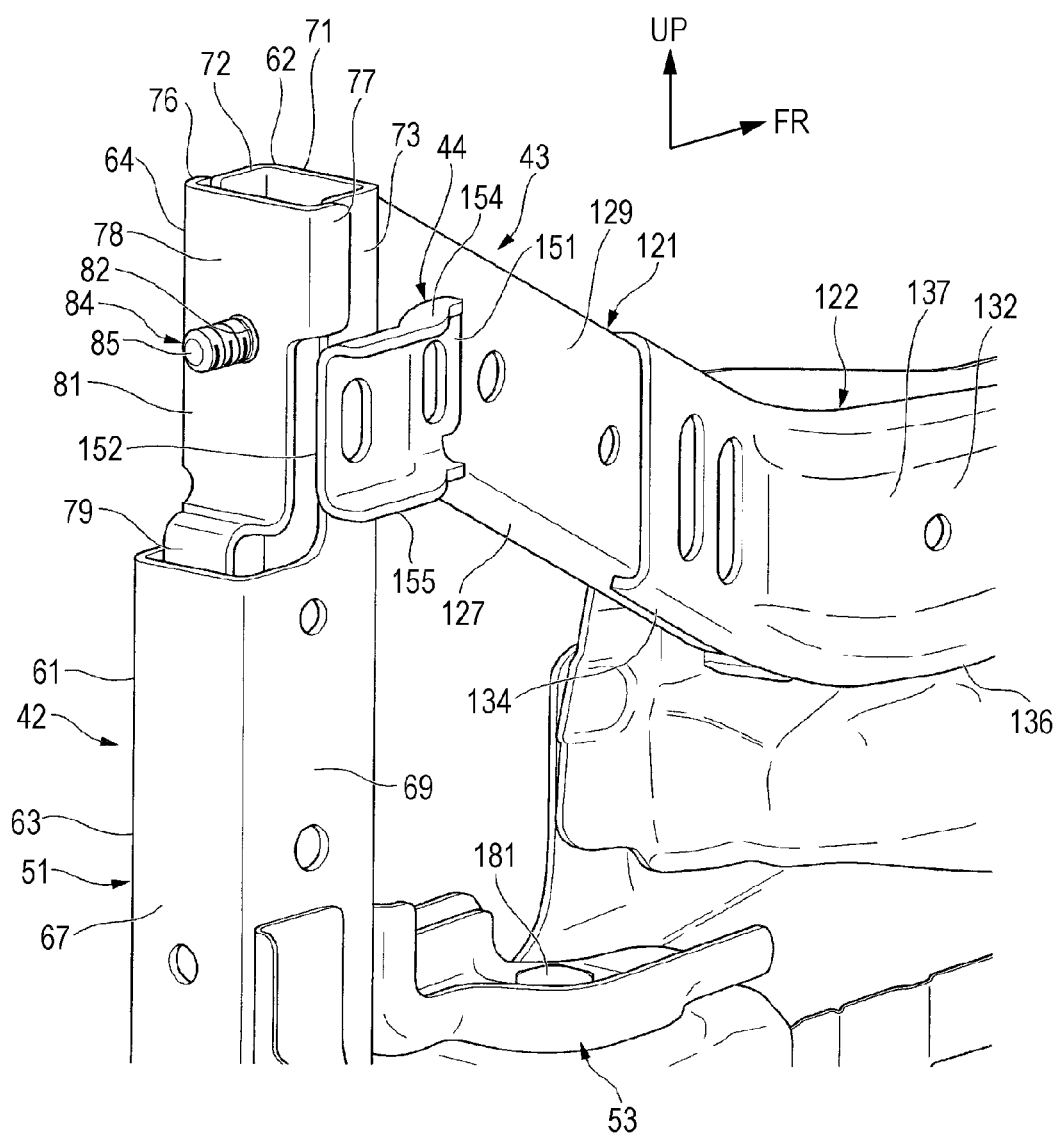
FIG. 5 is a perspective view of a protective frame, an upper load transmitting member, and the like of the vehicle rear body structure according to the embodiment.

The lower frame 61 has a square hollow column shape that has a front plate 66 illustrated in FIGS. 2 to 4, a rear plate 67 illustrated in FIG. 5, a side plate 68 illustrated in FIGS. 2 and 3, and a side plate 69 illustrated in FIGS. 4 and 5. The side plates 68 and 69 are respectively located on the outer and inner side of the lower frame 61 in the vehicle width direction.

The upper frame 62 has a U-shaped section and has a front plate 71 and side plates 72 and 73. As illustrated in FIGS. 2 to 4, the front plate 71 is continuous with the front plate 66 of the lower frame 61 and extends upward. As illustrated in FIGS. 2 and 3, the side plate 72 is continuous with the side plate 68 on the outer side of the lower frame 61 in the vehicle width direction and extends upward from a front portion of the side plate 68. As illustrated in FIGS. 4 and 5, the side plate 73 is continuous with the side plate 69 on the inner side of the lower frame 61 in the vehicle width direction and extends upward from a front portion of the side plate 69.

As illustrated in FIGS. 3 to 5, the cover member 64 has joint plates 76 and 77, a rear plate 78, and a joint piece 79. The joint plate 76 is joined to the side plate 72 on the outer side of the upper frame 62 in the vehicle width direction. The joint plate 77 is joined to the side plate 73 on the inner side of the upper frame 62 in the vehicle width direction. The rear plate 78 is parallel to the front plate 71 of the upper frame 62. The joint piece 79 is, as illustrated in FIG. 5, bent so as to extend rearward from a lower edge portion of the rear plate 78 and joined to an inner surface of the rear plate 67 of the lower frame 61. The cover member 64 is secured to the main member 63 so as to be integral with the main member 63 by, for example, welding such as metal inert gas (MIG) welding.

Figure 6:
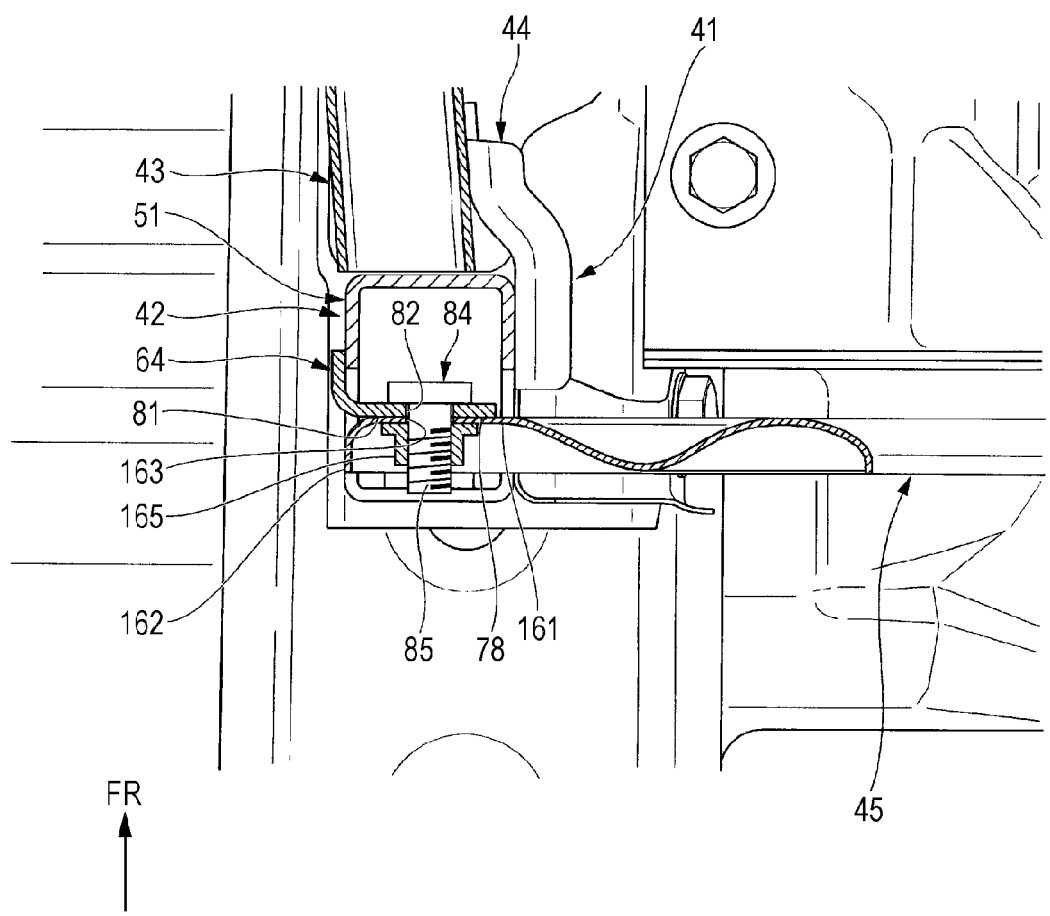
FIG. 6 is a horizontal sectional view of a fastening portion where an inclined frame is fastened to the protective frame in the vehicle rear body structure according to the embodiment.

Thus, the protective frame main body 51 has a hollow frame structure. The cover member 64 at the upper end portion of the protective frame main body 51 is disposed offset forward relative to the lower frame 61 of the main member 63. Accordingly, part of the protective frame main body 51 formed by the cover member 64 defines a recess 81, which is recessed forward in the protective frame main body 51. As illustrated in FIG. 6, the rear plate 78 of the cover member 64 has an insertion hole 82. A threaded shaft 85 of a bolt member 84 is inserted through the insertion hole 82 from the inside of the cover member 64, and, in this state, the bolt member 84 is welded to the cover member 64. Thus, the threaded shaft 85 of the bolt member 84 protrudes in the recess 81. The recess 81 receives an end portion of the inclined frame 45.

As illustrated in FIG. 4, the base member 52 has a base plate 91, a reinforcing plate 92, an attachment seat 93, a fastening seat (rear frame inner side surface fastening seat) 94, and an extension plate 95. The lower end portion of the protective frame main body 51 is disposed on the base plate 91, which is substantially horizontally disposed. The reinforcing plate 92 rises from an edge portion on the outer side of the base plate 91 in the vehicle width direction. The attachment seat 93 protrudes inward in the vehicle width direction from an intermediate portion of the base plate 91, the intermediate portion located at an intermediate position in the front-rear direction on the inner side of the base plate 91 in the vehicle width direction. The fastening seat 94 extends downward from part of an edge portion of the base plate 91, the part of the edge portion located on the inner side in the vehicle width direction on the front side relative to the attachment seat 93. The extension plate 95 extends downward from part of the edge portion of the base plate 91, the part of the edge portion located on the inner side in the vehicle width direction on the rear side relative to the attachment seat 93. As illustrated in FIG. 2, an insertion hole 96 is formed so as to penetrate through the fastening seat 94 in the vehicle width direction. As illustrated in FIG. 4, the attachment seat 93 has an insertion hole 97 that penetrates therethrough in the up-down direction. As illustrated in FIG. 2, a nut member 98 is welded to a lower surface of the attachment seat 93 at a position corresponding of the insertion hole 97.

As illustrated in FIG. 4, the lower end portion of the protective frame main body 51 is butt welded to a rear portion of the upper surface of the base plate 91 of the base member 52. In so doing, as illustrated in FIGS. 2 and 3, the side plate 68 of the lower frame 61 located on the outer side in the vehicle width direction is welded to the reinforcing plate 92. The protective frame main body 51 is MIG welded to the base member 52.

As illustrated in FIG. 4, the one reinforcing member 53 is disposed on the front side of the protective frame main body 51 and has a base plate 101, joint plates 102 and 103, and a reinforcing plate 104. The base plate 101 is disposed on the upper surface of the base plate 91 of the base member 52. The joint plate 102 rises from a rear edge portion of the base plate 101. The joint plate 103 rises from an end edge portion of the base plate 101, the end edge portion located on the outer side thereof in the vehicle width direction, and is continuous with an end edge portion of the joint plate 102, the end edge portion located on the outer side thereof in the vehicle width direction. The reinforcing plate 104 rises from an edge portion of the base plate 101, the end edge portion located on the inner side thereof in the vehicle width direction, and is continuous with an end edge portion of the joint plate 102, the end edge portion located on the inner side thereof in the vehicle width direction.

The base plate 101 of the reinforcing member 53 is welded to a front portion of the base plate 91 of the base member 52. The joint plate 102 of the reinforcing member 53 is welded to the front plate 66 of the lower frame 61 of the protective frame main body 51. The joint plate 103 of the reinforcing member 53 is welded to the reinforcing plate 92 of the base member 52. Welding used to secure the reinforcing member 53 to the protective frame main body 51 and the base member 52 is MIG welding except for the case where the base plate 101 is spot welded to the base plate 91.

A portion where the base plate 101 of the reinforcing member 53 and the base plate 91 of the base member 52 are superposed with each other defines a fastening seat (rear frame upper surface fastening seat) 105. As illustrated in FIG. 2, the fastening seat 105 has an insertion hole 106 that penetrates therethrough in the up-down direction.

As illustrated in FIG. 4, the other reinforcing member 54 is disposed on the inner side of the protective frame main body 51 in the vehicle width direction and has a base plate 111, joint plates 112 and 113, and a reinforcing plate 114. The base plate 111 is disposed on the rear portion of the upper surface of the base plate 91 of the base member 52. The joint plate 112 rises from an edge portion of the base plate 111, the edge portion located on the outer side thereof in the vehicle width direction. The joint plate 113 extends downward from an edge portion of the base plate 111, the edge portion located on the inner side thereof in the vehicle width direction. The reinforcing plate 114 rises from a rear end edge portion of the base plate 111 and is continuous with a rear end edge portions of the joint plates 112 and 113.

The base plate 111 of the reinforcing member 54 is welded to the rear portion of the base plate 91 of the base member 52. The joint plate 112 of the reinforcing member 54 is welded to the side plate 69 of the lower frame 61 of the protective frame main body 51, the side plate 69 located on the inner side of the main body 51 in the vehicle width direction. The joint plate 113 of the reinforcing member 54 is welded to the extension plate 95 of the base member 52. The reinforcing member 54 is MIG welded to the protective frame main body 51 and the base member 52.

A portion where the joint plate 113 of the reinforcing member 54 and the extension plate 95 of the base member 52 are superposed with each other defines a fastening seat (rear frame inner side surface fastening seat) 115. As illustrated in FIG. 2, the fastening seat 115 has an insertion hole 116 that penetrates therethrough in the vehicle width direction.

As illustrated in FIGS. 2 to 4, the upper load transmitting member 43 includes an upper load transmitting member main body 121, a fastening extension member 122, and a lid member 123. One end of the upper load transmitting member main body 121 is joined to a front surface of the front plate 71 of the upper frame 62, which is the upper end portion of the protective frame main body 51. The upper load transmitting member main body 121 extends forward. The fastening extension member 122 is joined to the inner side of the upper load transmitting member main body 121 in the vehicle width direction at the other end of the upper load transmitting member main body 121. The lid member 123 is, as illustrated in FIGS. 2 and 3, joined to the other end portion of the upper load transmitting member main body 121 and also joined to the fastening extension member 122.

The upper load transmitting member main body 121 has a hollow frame structure that has a square hollow column shape. The upper load transmitting member main body 121 has an upper plate 126 illustrated in FIGS. 2 to 4, a lower plate 127 illustrated in FIG. 5, a side plate 128 illustrated in FIGS. 2 and 3, and a side plate 129 illustrated in FIGS. 4 and 5. The upper plate 126 and the lower plate 127 are respectively positioned on the upper and lower sides of the main body 121. The side plates 128 and 129 are respectively located on the outer and inner sides of the main body 121 in the vehicle width direction. Both the end portions of the upper load transmitting member main body 121 are substantially parallel to each other and inclined relative to the lengthwise direction of the upper load transmitting member main body 121. As illustrated in FIGS. 2 to 4, the one end portion of the upper load transmitting member main body 121 is pushed against and welded to the front surface of the front plate 71 of the upper end portion of the protective frame main body 51 by, for example, MIG welding.

As illustrated in FIG. 4, the fastening extension member 122 has a base plate 131, an extension plate 132, joint plates 133 and 134, reinforcing bead portions 135 and 136. The extension plate 132 is continuous with the base plate 131 and extends forward. The joint plate 133 extends outward in the vehicle width direction from an upper edge portion of the base plate 131. The joint plate 134 illustrated in FIG. 5 extends outward in the vehicle width direction from a lower edge portion of the base plate 131. As illustrated in FIGS. 2 to 4, the bead portion 135 is formed in an upper edge portion of the extension plate 132 so as to extend along the upper edge portion. The bead portion 136 is formed in a lower edge portion of the extension plate 132 so as to extend along the lower edge portion.

The fastening extension member 122 is welded to the upper load transmitting member main body 121 by welding such as MIG welding as follows the base plate 131 illustrated in FIG. 4 is welded to the side plate 129 on the inner side thereof in the vehicle width direction; the upper joint plate 133 is welded to the upper plate 126; and the lower joint plate 134 illustrated in FIG. 5 is welded to the lower plate 127. In this state, as illustrated in FIGS. 2 to 4, the extension plate 132 and the bead portions 135 and 136 extend further forward than the upper load transmitting member main body 121, thereby defining a fastening extension 137. As illustrated in FIG. 3, the extension plate 132 of the fastening extension 137 has an insertion hole 138 formed in the vehicle width direction. As illustrated in FIGS. 2 to 4, the upper joint plate 133 and the upper bead portion 135 are continuous with each other, and as illustrated in FIG. 5, the lower joint plate 134 and the lower bead portion 136 are continuous with each other.

As illustrated in FIGS. 2 and 3, the lid member 123 is provided at the other end portion of the upper load transmitting member main body 121 opposite to the protective frame 42, that is, the lid member 123 is provided at the front end portion of the upper load transmitting member main body 121. The lid member 123 has a base plate 141 and joint plates 142, 143, 144, and 145. The base plate 141 covers an opening at the other end portion of the upper load transmitting member main body 121. The joint plate 142 extends rearward from an edge portion of the base plate, the edge portion located on the outer side of the base plate in the vehicle width direction. The joint plate 143 extends forward from an edge portion of the base plate 141, the edge portion located on the inner side thereof in the vehicle width direction. The joint plate 144 extends rearward from an upper edge portion of the base plate 141. The joint plate 145 extends rearward from a lower edge portion of the base plate 141.

As illustrated in FIG. 2, the lid member 123 is welded to the upper load transmitting member main body 121 by, for example, MIG welding as follows: the upper joint plate 144 is welded to the upper plate 126; the lower joint plate 145 is welded to the lower plate 127; and the joint plate 142 is welded to the side plate 128. The joint plate 143 of the lid member 123 is welded to the extension plate 132, which is part of the fastening extension 137 of the fastening extension member 122, by, for example, MIG welding. In the upper load transmitting member 43, the base plate 141 of the lid member 123, the base plate 141 facing the front, has a positioning hole 146 that penetrates therethrough in the front-rear direction.

As illustrated in FIG. 4, the reinforcing member 44 has a front plate 151 in a front portion thereof, a rear plate 152 in a rear portion thereof, an intermediate plate 153 that connects the front plate 151 and the rear plate 152 to each other, and reinforcing plates 154 and 155. The reinforcing plate 154 extends inward in the vehicle width direction from upper edge portions of the front plate 151, the intermediate plate 153, and the rear plate 152, the upper edge portions being continuous with one another. The reinforcing plate 155 extends inward in the vehicle width direction from lower edge portions of the front plate 151, the intermediate plate 153, and the rear plate 152, the lower edge portions being continuous with one another. The front plate 151 of the reinforcing member 44 is welded to the side plate 129 on the inner side of the upper load transmitting member main body 121 in the vehicle width direction by, for example, MIG welding. The rear plate 152 of the reinforcing member 44 is welded to the side plate 73 of the upper frame 62 of the protective frame main body 51 on the inner side thereof in the vehicle width direction.

As illustrated in FIGS. 2 to 4, the inclined frame 45 has a base plate 161 and a reinforcing portion 162. The reinforcing portion 162 extends rearward from a peripheral edge portion of the base plate 161 except for an end portion in the lengthwise direction of the base plate 161. An insertion hole 163 illustrated in FIG. 6 and an insertion hole 164 illustrated in FIGS. 2 to 4 are formed in the front-rear direction at the respective end portions of the base plate 161. As illustrated in FIG. 6, the above-described threaded shaft 85 of the recess 81 of the protective frame 42 is inserted through the insertion hole 163 at the end portion where the reinforcing portion 162 is formed. A nut member 165 is screwed onto the threaded shaft 85. Thus, the inclined frame 45 is clamped between the rear plate 78 of the cover member 64 and the nut member 165. By doing this, one end portion of the inclined frame 45 is fastened to the protective frame 42. In so doing, this one end portion is disposed in the recess 81.

Figure 7:
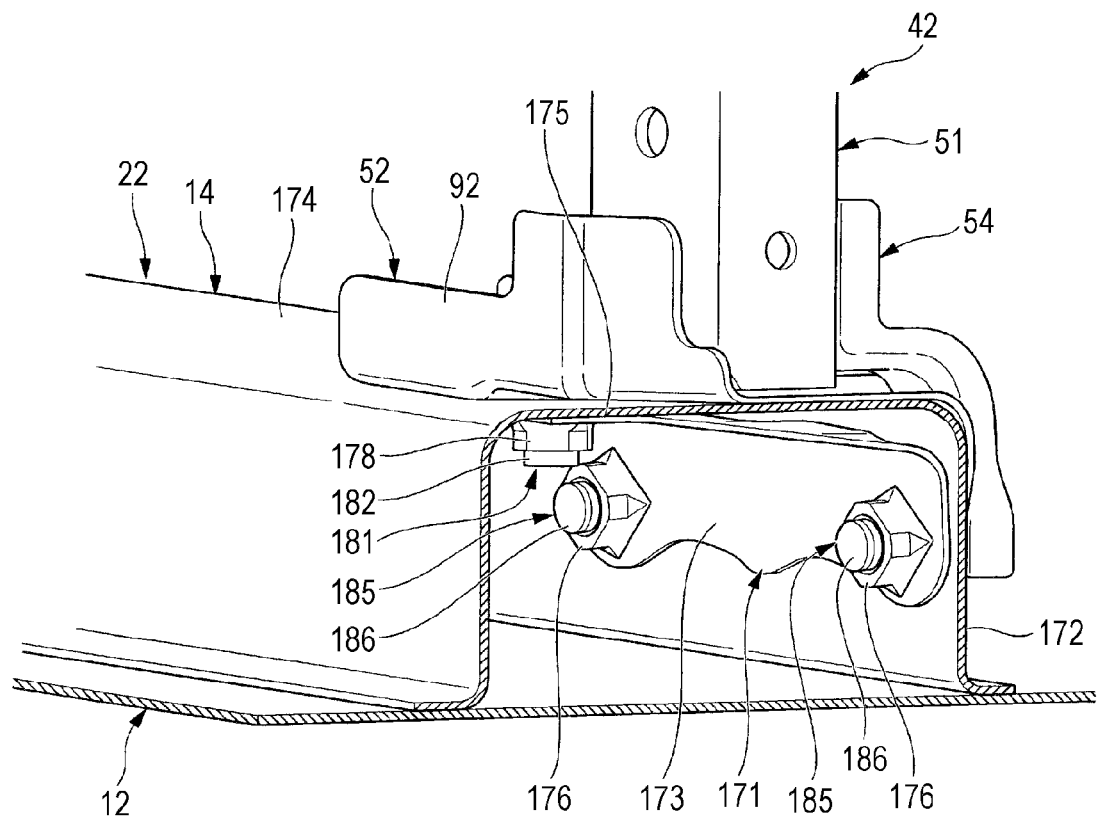
FIG. 7 is a perspective view of a fastening portion where the protective frame is fastened to a rear frame in the vehicle rear body structure according to the embodiment.

As illustrated in FIG. 7, an attachment stiffener 171 is secured by, for example, welding to an inner side of the rear frame 14 at a position at which the protective frame 42 is attached. The attachment stiffener 171 has a vertical plate 173 and a horizontal plate 175. The vertical plate 173 is joined to a side plate 172 of the rear frame 14 on the inner side in the vehicle width direction. The horizontal plate 175 is joined to an inner side of an upper plate 174 of the rear frames 14. Two front and rear nut members 176 are secured to the vertical plate 173 by, for example, welding such that the nut members 176 are aligned with two insertion holes (not shown) formed in the side plate 172 of the rear frame 14 and two insertion holes (not shown) formed in the vertical plate 173. Also, a single nut member 178 is secured to the horizontal plate 175 by, for example, welding such that the nut member 178 is aligned with an insertion hole (not shown) formed in the upper plate 174 of the rear frame 14 and the positions of an insertion hole (not shown) formed in the horizontal plate 175.

A threaded shaft 182 of a bolt member 181 is inserted through the insertion hole 106 of the fastening seat 105 illustrated in FIG. 2 and the like while the fastening seat 105 of the protective frame 42 illustrated in FIG. 4 is pushed against an upper surface of the upper plate 174 of the rear frame 14 illustrated in FIG. 7. After that, the threaded shaft 182 of the bolt member 181 is screwed into the nut member 178 of the attachment stiffener 171 illustrated in FIG. 7. Thus, the fastening seat 105 illustrated in FIG. 4 is clamped between a head 183 of the bolt member 181 illustrated in FIG. 4 and the rear frame 14 illustrated in FIG. 7.

Furthermore, threaded shafts 186 of two bolt members 185 are inserted through the insertion holes 96 and 116 of the fastening seats 94 and 115 illustrated in FIG. 2 and the like while the fastening seats 94 and 115 of the protective structure 41 illustrated in FIG. 4 are pushed against an inner side surface of the side plate 172, the inner side surface located on the inner side in the vehicle width direction, of the rear frame 14 illustrated in FIG. 7. After that, the threaded shafts 186 of the bolt members 185 are screwed into the nut members 176 of the attachment stiffener 171 illustrated in FIG. 7. Thus, the fastening seats 94 and 115 illustrated in FIG. 4 are clamped between heads 187 of the bolt members 185 illustrated in FIG. 4 and the rear frame 14 illustrated in FIG. 7.

Figure 8:
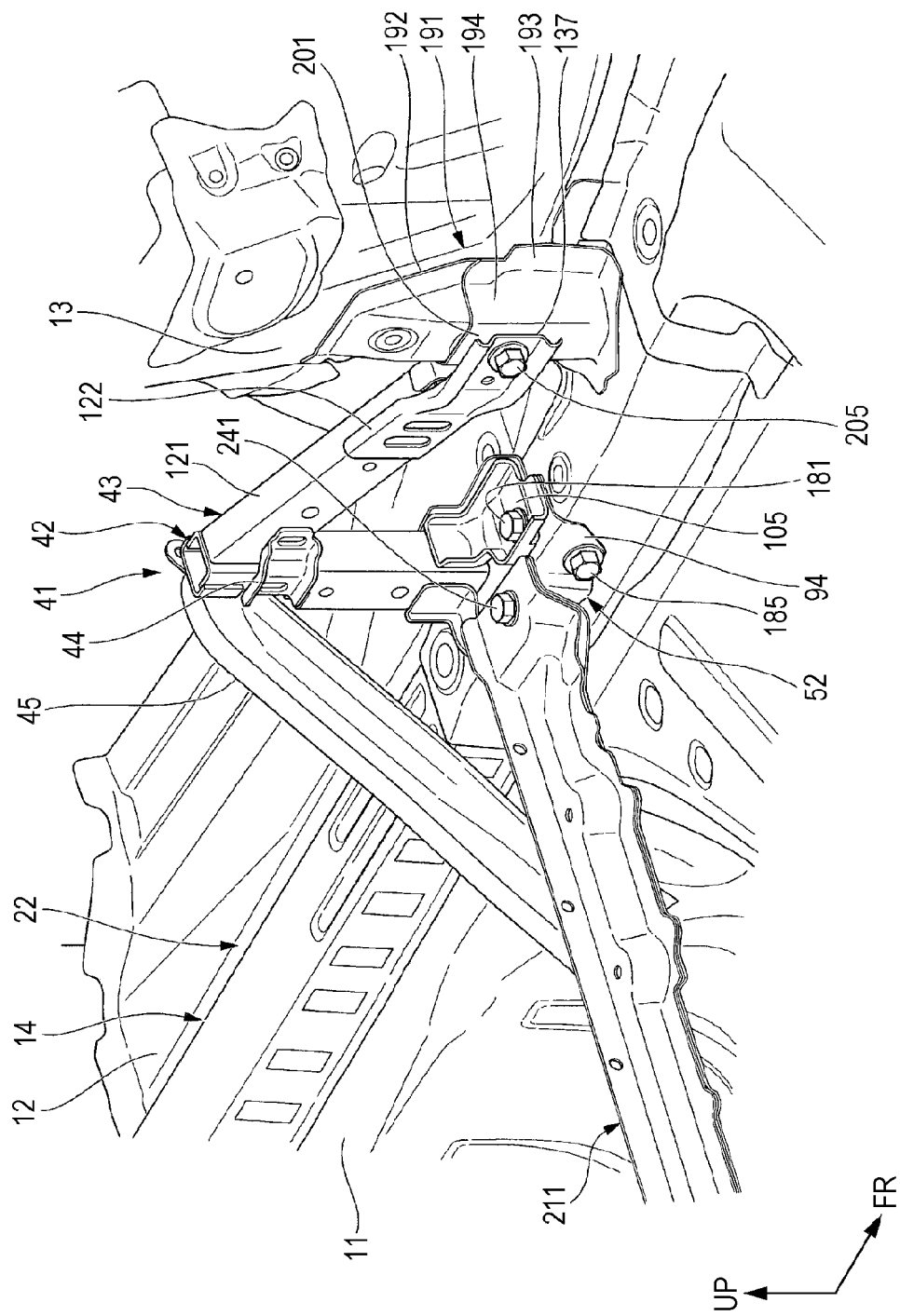
FIG. 8 is a perspective view of a main portion of the vehicle rear body structure according to the embodiment.

Thus, as illustrated in FIG. 8, a lower portion of the protective frame 42 of the protective structure 41 is attached to the rear frame 14 by fastening the lower portion of the protective frame 42 to the upper surface of the rear frame 14 through the fastening seat 105 and to the inner side surface of the rear frame 14 through the fastening seat 94 and the fastening seat 115 illustrated in FIG. 4. In this state, as illustrated in FIG. 7, the attachment stiffener 171 is provided inside the rear frame 14 at a position corresponding to the fastening seat 105 illustrated in FIG. 4 to clamp the upper plate 174 of the rear frame 14 between the stiffener 171 and the seat 105 and also corresponding to the fastening seats 94 and 115 illustrated in FIG. 4 to clamp the side plate 172 of the rear frame 14 illustrated in FIG. 7 therebetween. The stiffener 171 is positioned on the opposite side of the upper plate 174 from the fastening seat 105, and on the opposite side of the side plate 172 from the fastening seat 94. When the base member 52 provided in the lower portion of the protective frame 42 is secured to the rear frame 14 as illustrated in FIG. 8, the base member 52 is integrated with the rear frame 14 and functions as part of the rear frame 14.

A wheel housing reinforcing gusset 191 that reinforces the rear wheel housing 13 is joined to an inner side surface of the rear wheel housing 13 in the vehicle width direction. The upper load transmitting member 43 of the protective structure 41 extends from the upper end portion of the protective frame 42 to the wheel housing reinforcing gusset 191 and is fastened to the wheel housing reinforcing gusset 191. The wheel housing reinforcing gusset 191 has a hat-shaped cross section, forms a closed section with the rear wheel housing 13, and extends in the up-down direction. Here, the outer side of the rear frame 14 in the vehicle width direction is connected to the rear wheel housing 13, thereby forming a corner portion. The wheel housing reinforcing gusset 191 extends to this corner portion and a lower end portion thereof is connected to the corner portion.

Figure 9:
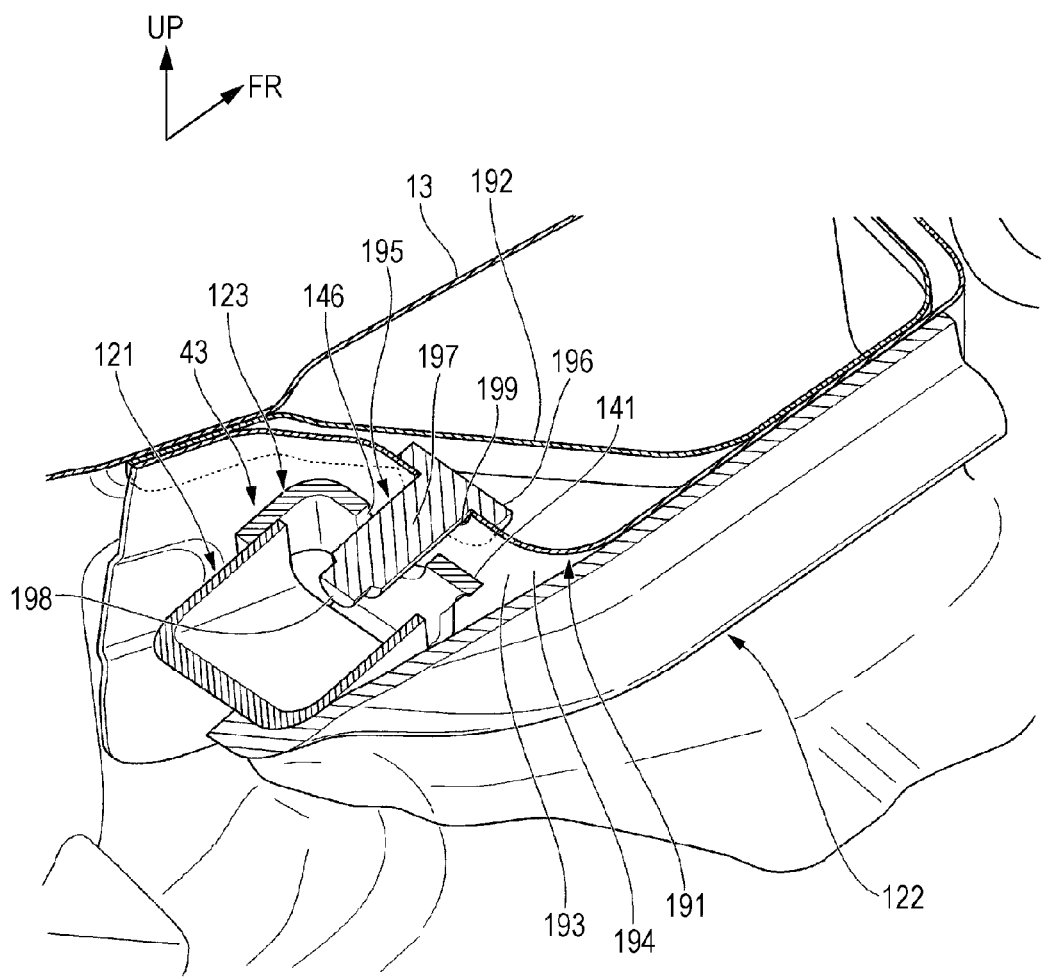
FIG. 9 is a perspective sectional view of an engagement portion where the upper load transmitting member is engaged with a wheel housing reinforcing gusset in the vehicle rear body structure according to the embodiment.

The wheel housing reinforcing gusset 191 has an upper gusset 192 at the upper portion and a lower gusset 193 at the lower portion. The position of an upper portion of the lower gusset 193 and the position of the lower portion of the upper gusset 192 are superposed with each other in the up-down direction such that the upper portion of the lower gusset 193 covers the lower portion of the upper gusset 192. In the wheel housing reinforcing gusset 191, a overlapped portion 194 is defined at a position where the position of the lower portion of the upper gusset 192 and the position of the upper portion of the lower gusset 193 are superposed with each other. As illustrated in FIG. 9, an engagement pin 195 rearwardly (that is, toward the luggage compartment 11 illustrated in FIG. 1) protrudes on a rear surface at the position of the overlapped portion 194.

The engagement pin 195 has a flange 196, a main shaft portion 197, and a shaft tip portion 198. The diameter of the main shaft portion 197 is smaller than that of the flange 196, and the diameter of the shaft tip portion 198 is smaller than that of the main shaft portion 197. An attachment hole 199 is formed in a rear surface of a portion of the lower gusset 193 where the overlapped portion 194 is defined. The shaft tip portion 198 and the main shaft portion 197 of the engagement pin 195 are inserted through the attachment hole 199 from the front. The flange 196 of the engagement pin 195 is pushed against a front surface of the lower gusset 193 and secured to the front surface of the lower gusset 193 by welding or the like. Thus, the shaft tip portion 198 and the main shaft portion 197 of the engagement pin 195 protrude rearward from the overlapped portion 194 of the wheel housing reinforcing gusset 191.

As illustrated in FIG. 9, the engagement pin 195 is engaged with the positioning hole 146 formed in the lid member 123 of the upper load transmitting member 43 of the protective structure 41 illustrated in FIGS. 2 and 3. Thus, the engagement pin 195 supports a front portion of the upper load transmitting member 43 while positioning the upper load transmitting member 43 in the up-down direction and also in the vehicle width direction.

Figure 10:
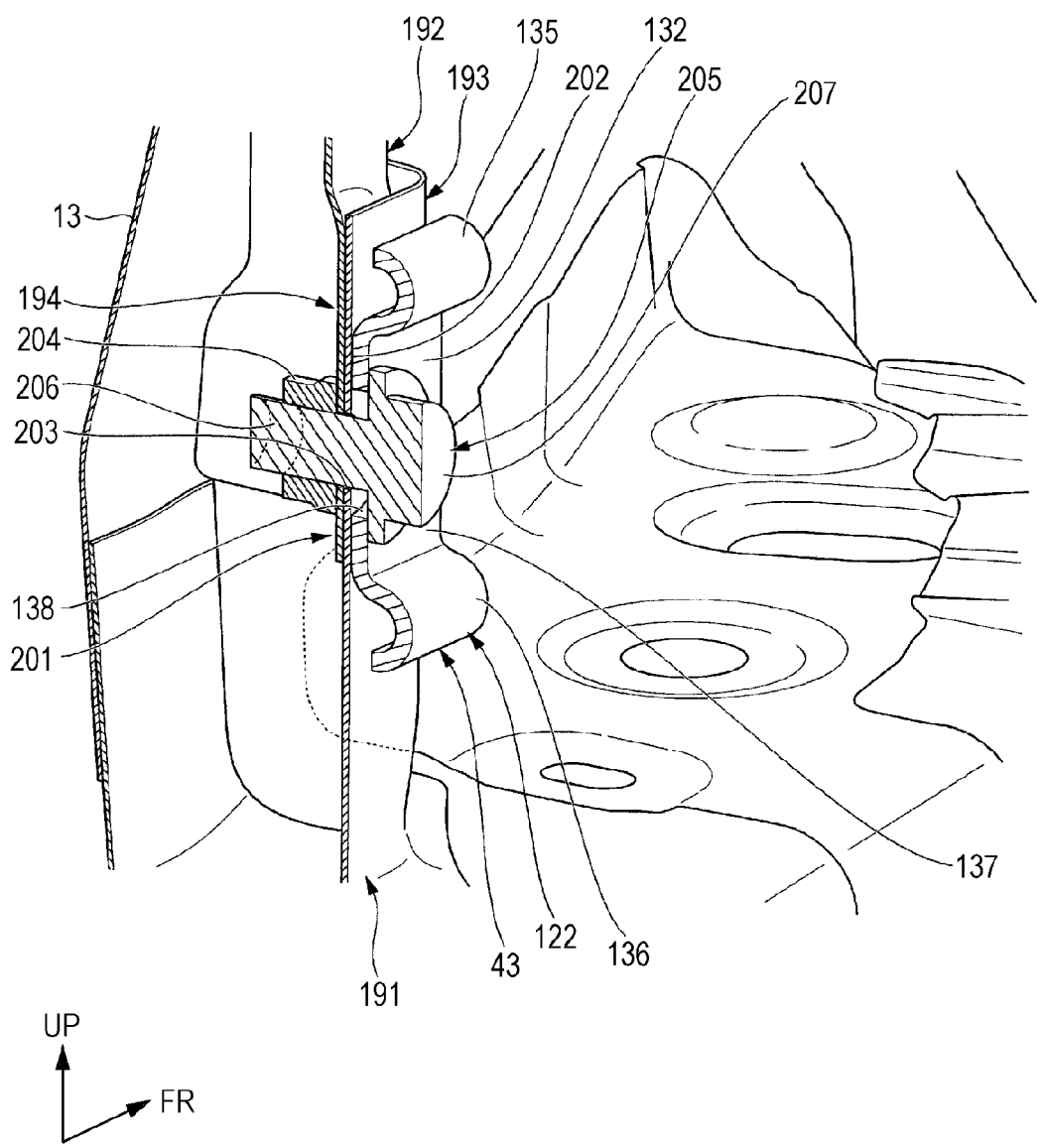
FIG. 10 is a perspective sectional view of a fastening portion where the upper load transmitting member is fastened to the wheel housing reinforcing gusset in the vehicle rear body structure according to the embodiment.

As illustrated in FIG. 10, a fastening portion 201 is provided at a portion of the overlapped portion 194 of the wheel housing reinforcing gusset 191, the portion located on the inner side thereof in the vehicle width direction. The fastening portion 201 has a seating portion 202, an insertion hole 203, and a nut member 204. The seating portion 202 is part of the overlapped portion 194, the part located on the inner side thereof in the vehicle width direction. The insertion hole 203 penetrates through the seating portion 202 in the vehicle width direction. The nut member 204 is aligned with the insertion hole 203 and secured to the inner surface of the upper gusset 192 by welding or the like.

The fastening extension 137 of the upper load transmitting member 43 is fastened to the fastening portion 201. That is, a threaded shaft 206 of a bolt member 205 is inserted from the inside in the vehicle width direction through the insertion hole 138 formed in the fastening extension 137 of the upper load transmitting member 43 and the insertion hole 203 of the fastening portion 201, and the threaded shaft 206 is screwed into the nut member 204. By doing this, the extension plate 132 of the fastening extension 137 of the upper load transmitting member 43 is clamped between a head 207 of the bolt member 205 and the seating portion 202 of the overlapped portion 194 of the wheel housing reinforcing gusset 191. Thus, as illustrated in FIG. 8, the fastening extension 137 of the upper load transmitting member 43 is fastened to and secured to an inner side surface of the wheel housing reinforcing gusset 191 on the inner side (near the center) in the vehicle width direction.

Figure 11:
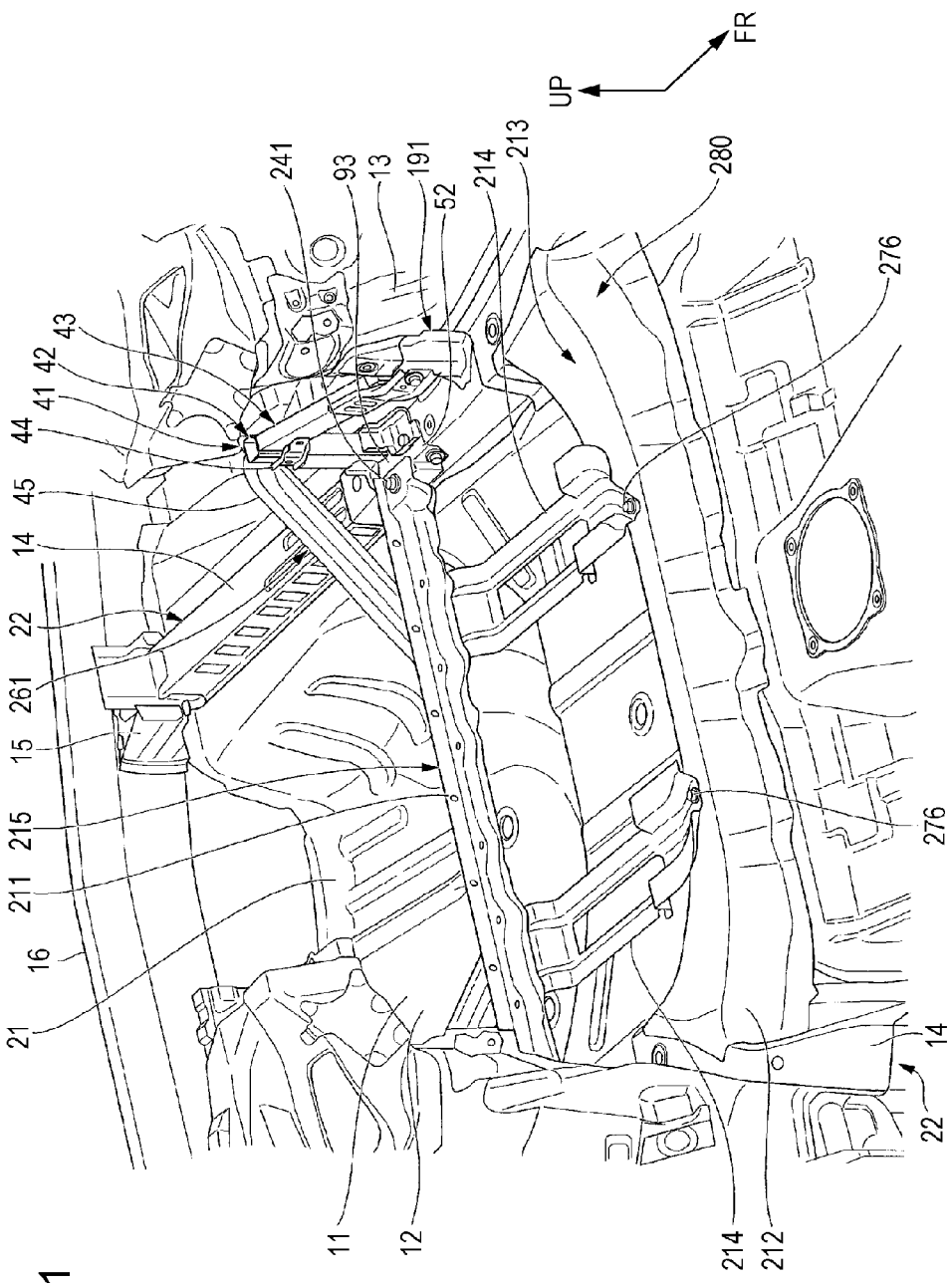
FIG. 11 is a perspective view of the protective structure, a box frame, and the like of the vehicle rear body structure according to the embodiment.

As illustrated in FIG. 1, a box lateral member 211 extends in the vehicle width direction and is disposed between the left and right rear frames 14 in the front portion of the luggage compartment 11 on the rear side of the rear seat 25. Also, as illustrated in FIG. 11, a rear cross member 212 extends in the vehicle width direction and is disposed between the left and right rear frames 14 on the front side of the box lateral member 211. The rear cross member 212 has a hat-shaped cross section and is welded to the rear floor panel 12, thereby forming a vehicle body frame 213 that has a closed section with the rear floor panel 12. Thus, the vehicle body frame 213 that is disposed extending in the vehicle width direction and formed of the rear cross member 212 and the rear floor panel 12 is connected to the vehicle body frames 22 that are disposed extending in the front-rear direction on both sides in the vehicle width direction and formed of the rear frames 14 and the rear floor panel 12.

A pair of box longitudinal members 214 extending in the front-rear direction are disposed between the box lateral member 211 and the rear cross member 212 and spaced apart from each other in the vehicle width direction. A rear end portion of each box longitudinal member 214 is joined to the box lateral member 211 by welding or the like, thereby forming a box frame 215 with the box lateral member 211. The electrical component box 26 illustrated in FIG. 1 is mounted on the box frame 215.

Figure 12:
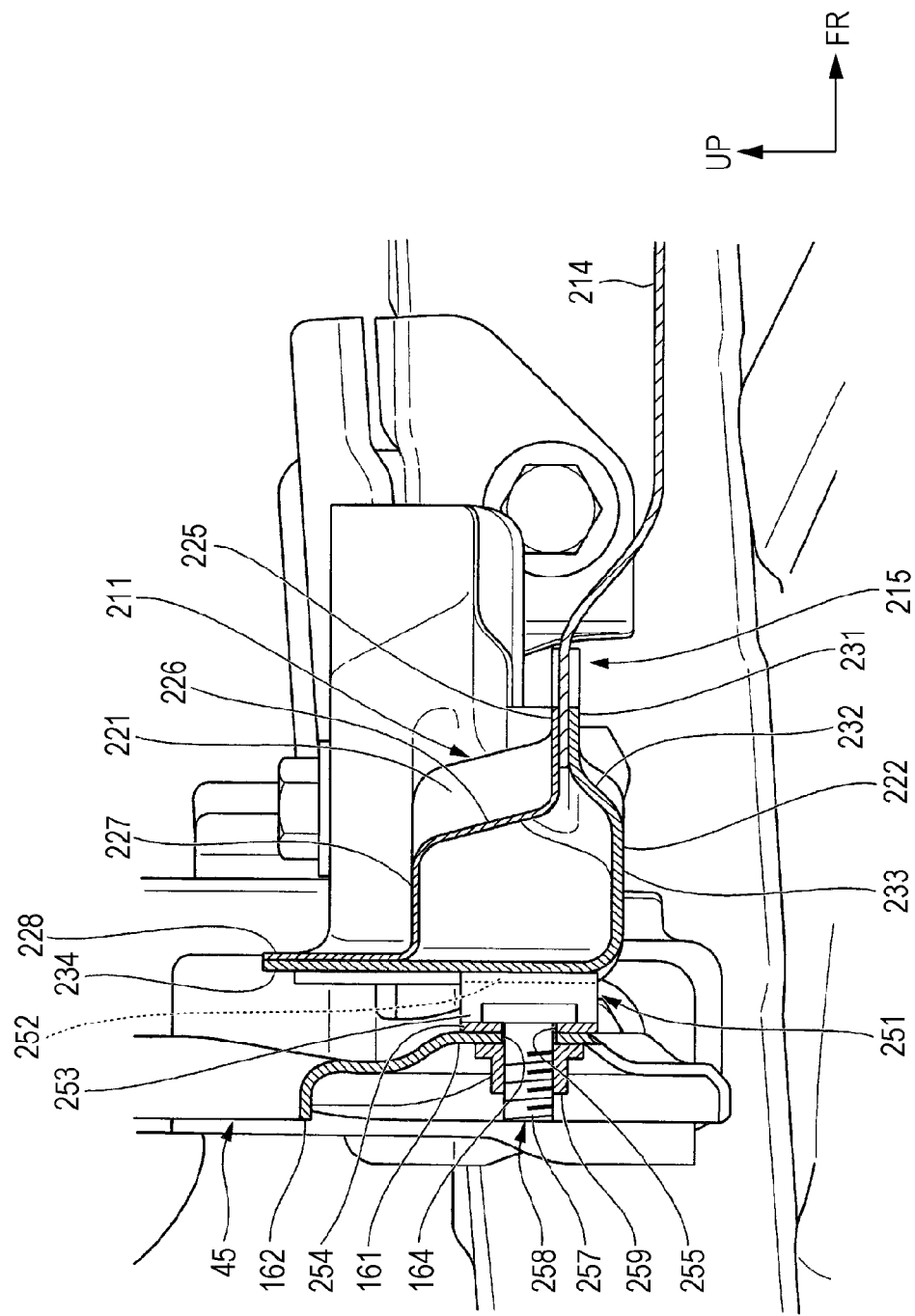
FIG. 12 is a side sectional view of a fastening portion where the inclined frame is fastened to a box lateral member in the vehicle rear body structure according to the embodiment.

As illustrated in FIG. 12, the box lateral member 211 has an upper member 221 and a lower member 222, thereby forming a closed section. The upper member 221 has a front plate 225, an inclined plate 226, an upper plate 227, and a rear plate 228. The front plate 225 is substantially horizontally disposed. The inclined plate 226 extends from a rear edge portion of the front plate 225 so as to be inclined upward toward the rear. The upper plate 227 substantially horizontally extends rearward from an upper edge portion of the inclined plate 226. The rear plate 228 extends upward from a rear edge portion of the upper plate 227. The lower member 222 has a front plate 231, an inclined plate 232, a lower plate 233, and a rear plate 234. The front plate 231 is substantially horizontally disposed. The inclined plate 232 extends from a rear edge portion of the front plate 231 so as to be inclined downward toward the rear. The lower plate 233 substantially horizontally extends rearward from a rear edge portion of the inclined plate 232. The rear plate 234 extends upward from a rear edge portion of the lower plate 233.

The front plate 225 of the upper member 221 and the front plate 231 of the lower member 222 are welded to each other, and the rear plate 228 of the upper member 221 and the rear plate 234 of the lower member 222 are welded to each. At a position where the upper member 221 and the lower member 222 are joined to the box longitudinal members 214, as illustrated in FIG. 12, the rear end portion of each box longitudinal member 214 is clamped between the front plate 225 and the front plate 231, and in this state, the upper member 221, the lower member 222, and the box longitudinal members 214 are welded to one another.

Figure 13:
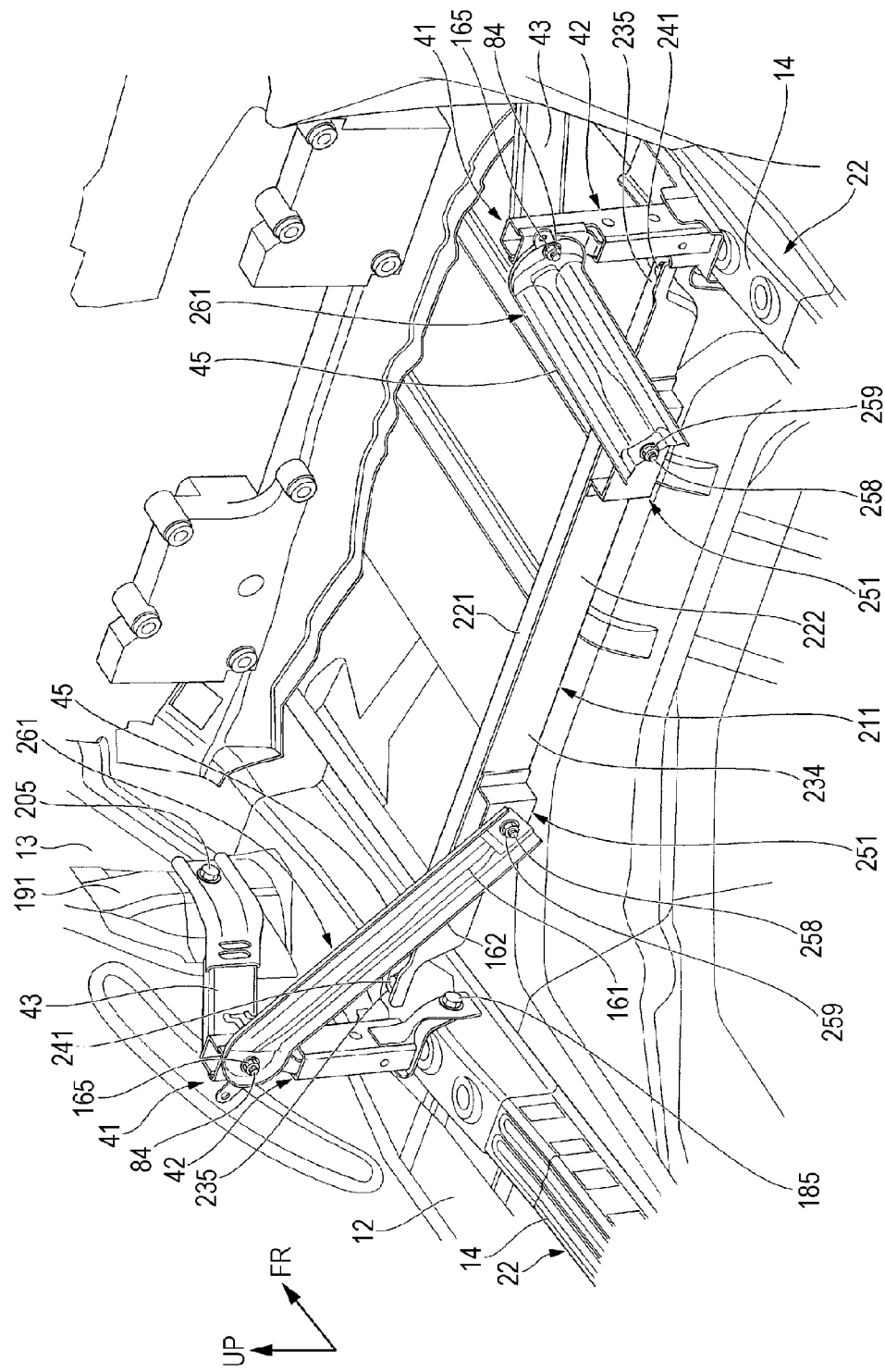
FIG. 13 is a perspective view of a main portion of the vehicle rear body structure according to the embodiment.

As illustrated in FIG. 13, the box lateral member 211 is line symmetric about a line extending in the front-rear direction of the vehicle and has attachment portions 235 attached to the left and right rear frames 14 on the left and right ends, respectively.

Figure 14:
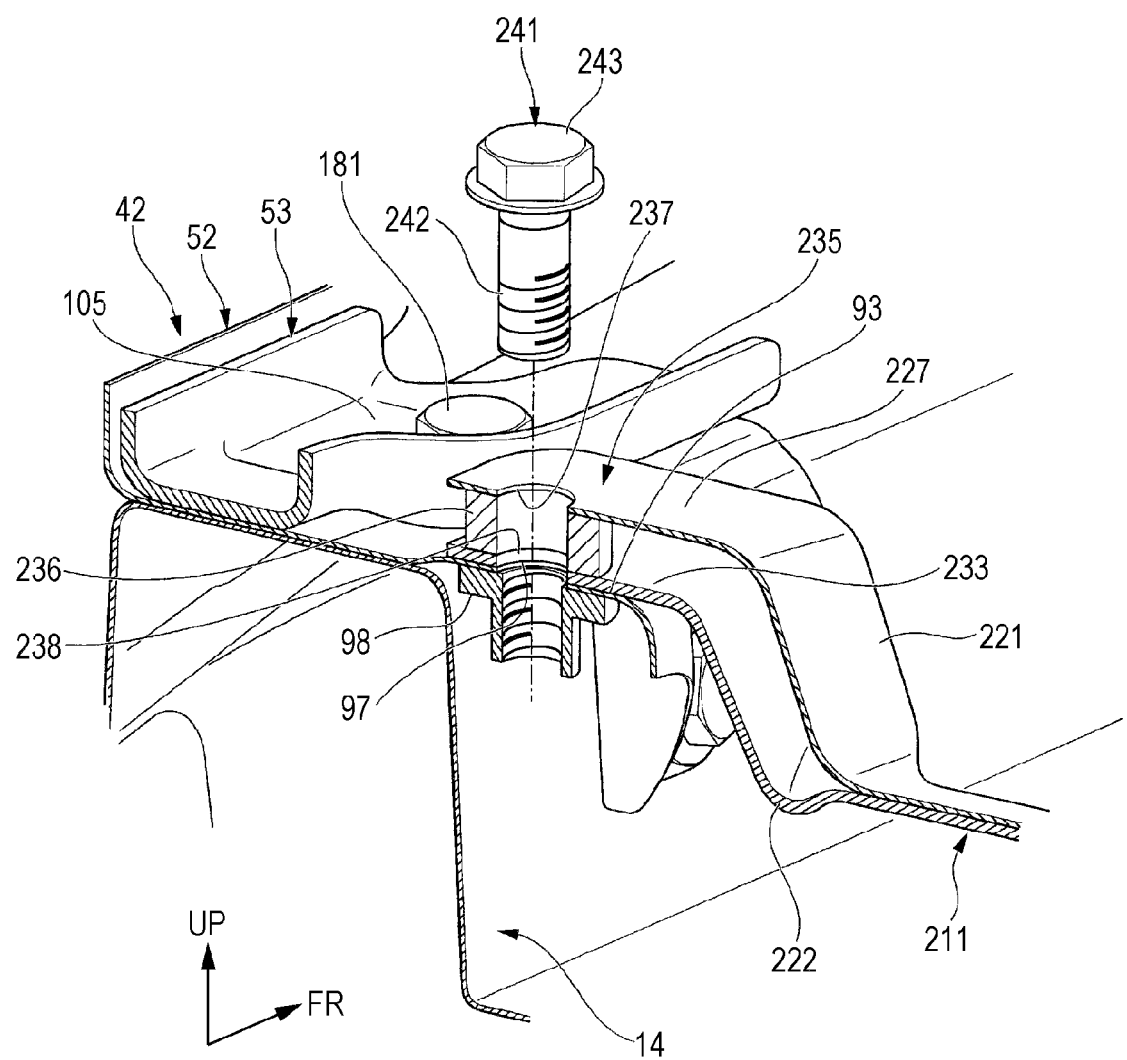
FIG. 14 is a sectional perspective view of a fastening portion where the box lateral member is fastened to the rear frame in the vehicle rear body structure according to the embodiment.

As illustrated in FIG. 14, each attachment portion 235 has the upper member 221, the lower member 222, and a collar 236 disposed therebetween. The upper member 221 has an insertion hole 237 that penetrates through the upper plate 227 in the up-down direction. The lower member 222 has an insertion hole 238 that penetrates through the lower plate 233 in the up-down direction. The collar 236 is aligned with the insertion holes 237 and 238 and welded to the upper member 221 and the lower member 222.

Each attachment portion 235 of the box lateral member 211 is attached to the attachment seat 93 of the base member 52 of the protective frame 42 with a bolt member 241. That is, the attachment portion 235 of the box lateral member 211 is placed on the attachment seat 93 of the base member 52, and in this state, a thread shaft 242 of the bolt member 241 is inserted through the insertion hole 237, a space inside the collar 236, and the insertion hole 238, and also inserted through the insertion hole 97 of the attachment seat 93. The threaded shaft 242 of the bolt member 241 is screwed into the nut member 98. Thus, the box lateral member 211 is clamped between the attachment seat 93 of the protective frame 42 and a head 243 of the bolt member 241. In this state, the box lateral member 211 is fastened to the attachment seat 93 while the collar 236 provided therein on each end thereof is clamped between the box lateral member 211 and the attachment seat 93.

Accordingly, the attachment seat 93 of the protective frame 42 serves as an attachment seat for the box lateral member 211 of the box frame 215, which supports the electrical component box 26 illustrated in FIG. 1. As illustrated in FIG. 14, since the base member 52 of the protective frame 42 that has the attachment seat 93 serves as part of the rear frame 14 when the base member 52 is secured to the rear frame 14, the end portion of the box lateral member 211 is fastened to the rear frames 14.

As illustrated in FIG. 13, a pair of brackets 251 are welded to both ends of a rear surface of the rear plate 234 of the lower member 222 of the box lateral member 211, the both ends are ends in the vehicle width direction.

Figure 15:
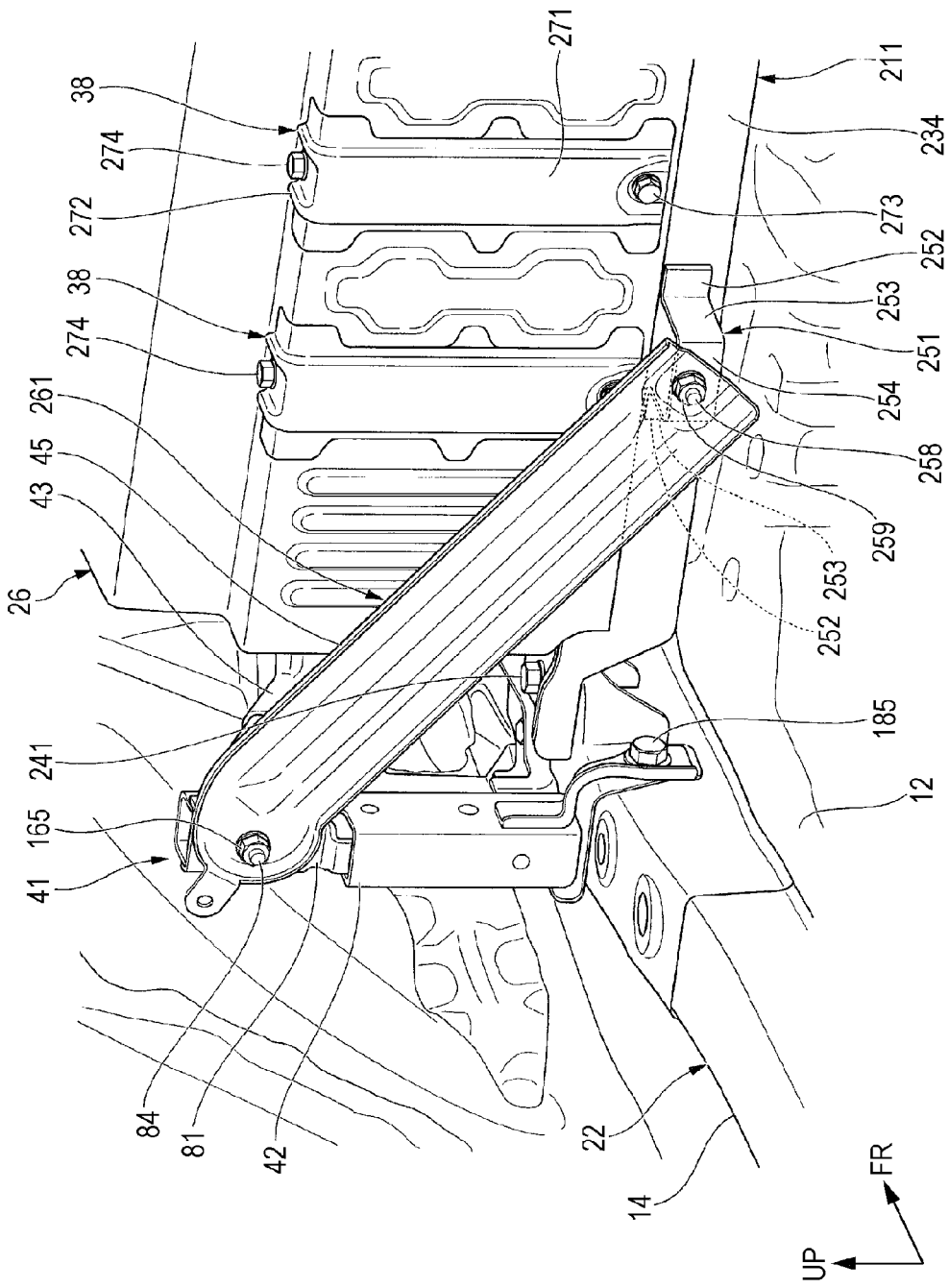
FIG. 15 is a perspective view of a main portion of the vehicle rear body structure according to the embodiment.

As illustrated in FIG. 15, each bracket 251 has a pair of joint plates 252, a pair of intermediate plates 253, and a support plate 254. The joint plates 252 are joined to the rear surface of the rear plate 234. The intermediate plates 253 extend rearward from edge portions of the respective joint plates 252, the edge portions being adjacent to each other. The support plate 254 connects rear edge portions of the intermediate plates 253 to each other. As illustrated in FIG. 12, the support plate 254 has an insertion hole 255 that penetrates therethrough in the front-rear direction. The bolt member 258 is secured to a front surface of the support plate 254 by welding or the like with a threaded shaft 257 thereof inserted through the insertion hole 255. Thus, the threaded shaft 257 of the bolt member 258 protrudes rearward from the support plate 254 of the brackets 251. The threaded shaft 257 of the bolt member 258 is inserted through the insertion hole 164 of the inclined frame 45. In this state, the nut member 259 is screwed onto the threaded shaft 257, thereby, the base plate 161 of the inclined frame 45 is clamped between the support plate 254 of the bracket 251 and the nut member 259. Thus, the inclined frame 45 is secured to the box lateral member 211.

In this state, as illustrated in FIG. 13, the inclined frame 45 is inclined downward toward the interior in the vehicle width direction, thereby connecting the upper end portion of the protective frame 42 to the box lateral member 211. Thus, the protective frame 42, the box lateral member 211, and the inclined frame 45 form a truss structure 261 in the vehicle width direction. That is, the protective frame 42, the box lateral member 211, and the inclined frame 45 serve as a truss structure disposed in the vehicle width direction. A pair of the left and right truss structures 261 are formed of the pair of left and right protective structures 41 and the box lateral member 211.

As illustrated in FIG. 15, the reinforcing stiffeners 38 that reinforce the rear surface of the electrical component box 26 each have a main reinforcing portion 271 and an attachment portion 272. The main reinforcing portion 271 extends in the up-down direction. The attachment portion 272 extends forward from an upper edge portion of the main reinforcing portion 271. A lower end portion of the main reinforcing portion 271 is fastened to the rear surface of the electrical component box 26 with a bolt member 273. The attachment portion 272 is fastened to an upper surface of the electrical component box 26 with the bolt member 274. As illustrated in FIG. 1, out of the plurality of reinforcing stiffeners 38, the reinforcing stiffeners 38 disposed at both ends located on the outer positions in the vehicle width direction are superposed with the inclined frames 45 of the protective structures 41 in the vehicle width direction and the up-down direction. The reinforcing stiffeners 38 other than those disposed at both the ends in the vehicle width direction are disposed between the protective structures 41 which are located on the both sides in the vehicle width direction.

In order to attach the protective structures 41 illustrated in FIGS. 2 to 4, for example, the protective frame 42, the upper load transmitting member 43, and the reinforcing member 44 are integrated with one another as an integrated unit as illustrated in FIG. 5 before the inclined frame 45 is attached. Among the integrated unit, the fastening seat 105 of the base member 52 illustrated in FIG. 4 is placed on the upper surface of the rear frame 14 illustrated in FIG. 8 from the rear, and, while the fastening seats 94 and 115 of the base member 52 illustrated in FIG. 4 is caused to face the inner side surface of the rear frame 14 illustrated in FIG. 8, the positioning hole 146 of the upper load transmitting member 43 is engaged with the engagement pin 195 of the wheel housing reinforcing gusset 191 as illustrated in FIG. 9.

In this state, the insertion hole 106 of the fastening seat 105 of the base member 52 illustrated in FIG. 2, an insertion hole (not shown) of the rear frame 14, and the nut member 178 of the attachment stiffener 171 illustrated in FIG. 7 are substantially aligned with one another; the insertion holes 96 and 116 of the fastening seats 94 and 115 of the base member 52 illustrated in FIG. 2, the insertion holes (not shown) of the rear frame 14, and the nut members 176 of the attachment stiffener 171 illustrated in FIG. 7 are substantially aligned with one another; and the insertion hole 203 of the fastening portion 201 of the wheel housing reinforcing gusset 191 and the insertion hole 138 of the fastening extension 137 of the upper load transmitting member 43 illustrated in FIG. 10 are substantially aligned with each other.

Then, the bolt member 181 is inserted from above through the insertion hole 106 of the fastening seat 105 of the base member 52 illustrated in FIG. 2 and screwed into the nut member 178 of the attachment stiffener 171 illustrated in FIG. 7; the bolt members 185 are inserted from the side through the insertion holes 96 and 116 of the fastening seats 94 and 115 of the base member 52 illustrated in FIG. 2 and screwed into the nut members 176 of the attachment stiffener 171 illustrated in FIG. 7; and the bolt member 205 is inserted from the inside in the vehicle width direction through the insertion hole 138 of the fastening extension 137 of the upper load transmitting member 43 illustrated in FIG. 10 and screwed into the nut member 204 of the fastening portion 201 of the wheel housing reinforcing gusset 191. Thus, the integrated unit formed by integrating the protective frame 42, the upper load transmitting member 43, and the reinforcing member 44 with one another is secured to the rear frame 14 and the wheel housing reinforcing gusset 191.

The integrated units each formed by integrating the protective frame 42, the upper load transmitting member 43, and the reinforcing member 44 with one another illustrated in FIG. 11 are attached to both the left and right portions. After that, both the end portions of the box lateral member 211 of the box frame 215 are placed on the attachment seats 93 of the base members 52 of the protective frames 42 of the integrated units and front end portions of the box longitudinal members 214 of the box frame 215 are placed on the rear cross member 212.

In this state, the box lateral member 211 is fastened to the attachment seat 93 on each of the left and right sides thereof by inserting the bolt member 241 through the insertion hole 237 of the box lateral member 211, a space inside the collar 236, and the insertion hole 238 and by screwing the bolt member 241 into the nut member 98 of the attachment seat 93 of the base member 52 of the protective frame 42 as illustrated in FIG. 14. Also, the front end portions of the box longitudinal members 214 illustrated in FIG. 11 are fastened to the upper surface of the rear cross member 212 with the bolt members 276. Thus, the box frame 215 is secured to the rear frames 14 on both sides and the rear cross member 212. In this state, the left and right vehicle body frames 22 each having a closed section, the front side vehicle body frame 213 that has a closed section, and the rear side box lateral member 211 that has a closed section are connected to one another to have a rectangular shape, thereby forming a firm rectangular frame 280.

Then, the bolt member 84 at the upper end portion of the protective frame main body 51 is inserted through the insertion hole 163 of the inclined frame 45 as illustrated in FIG. 6, the bolt member 258 of the brackets 251 of the box lateral member 211 is inserted through the insertion hole 164 of the inclined frame 45 as illustrated in FIG. 12, and the nut members 165 and 259 are screwed onto the bolt members 84 and 258. Thus, the inclined frame 45 is secured to the protective frame 42 and the box lateral member 211.

The above-described attaching work is performed for the inclined frames 45 on both the left and right ones. After that, the electrical component box 26 illustrated in FIG. 1 is placed on and secured to the box frame 215. In this state, the rectangular frame 280 illustrated in FIG. 11 is positioned so as to surround an area around a lower portion of the electrical component box 26 in the horizontal direction.

When the components are combined with one another as described above, as illustrated in FIG. 1, the protective frames 42 are positioned on the rear side of the electrical component box 26 and stand erect on the upper surfaces of the rear frames 14. The distance between the left and right protective frames 42 in the attached state is smaller than the length of the rear bumper beam 16.

Also, when the components are combined with one another as described above, as illustrated in FIG. 8, the upper load transmitting member 43 extends forward from the upper end portion of the protective frame 42 to the wheel housing reinforcing gusset 191, the engagement pin 195 that protrudes rearward from the rear surface of the wheel housing reinforcing gusset 191 illustrated in FIG. 9 is engaged with the positioning hole 146, and, as illustrated in FIG. 10, the fastening extension 137 is fastened to the inner side surface of the wheel housing reinforcing gusset 191. Also, as illustrated in FIG. 1, each protective frame 42 together with the box lateral member 211 of the box frame 215, which supports the electrical component box 26, and a corresponding one of the inclined frames 45, which connects the upper end portion of the protective frame 42 to the box frame 215, forms the truss structure 261 in the vehicle width direction. Furthermore, the plurality of reinforcing stiffeners 38 are provided on the rear surface of the electrical component box 26 between the truss structures 261 on both sides in the vehicle width direction. The cooling fan 33 and the duct 34 of the cooling device 31, which is connected to the electrical component box 26, is disposed between the rear wheel housing 13 on the right in the vehicle width direction and the rear frame 14 and the protective structure 41 on the right in the vehicle width direction.

Figure 16A:
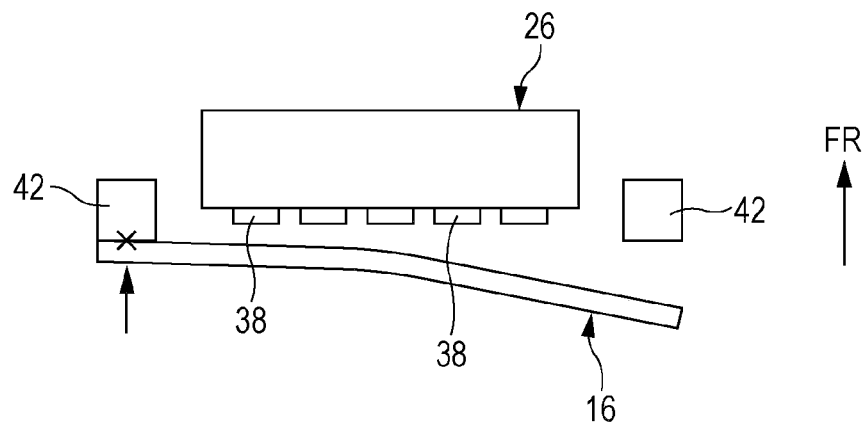
FIGS. 16A and 16B are plan views generally illustrating examples of states of the vehicle rear body structure according to the embodiment in the case of a rear-end collision.

In the case where the vehicle is involved in a rear-end collision, for example, the rear bumper beam extensions 15 may be removed from the rear frames 14, and the rear bumper beam 16 together with the rear bumper beam extensions 15 may be pushed and moved forward by another vehicle having collided with the vehicle. According to the present embodiment stated above, even in this case, as illustrated in FIG. 16A, the rear bumper beam 16 is brought into contact with the protective frame 42 before it is brought into contact with the electrical component box 26. As illustrated in FIG. 11, the protective frame 42 stands erect on the upper surface of the rear frame 14 and, from the upper end portion of the protective frame 42, the upper load transmitting member 43 extends to the wheel housing reinforcing gusset 191. Thus, at this time, a load received by the protective frame 42 is transmitted by the rear frame 14 at the lower portion and by the upper load transmitting member 43 at the upper portion. Accordingly, a load from the rear bumper beam 16 is received by the protective frame 42 in a desirable manner. This can suppress input of load to the electrical component box 26 positioned on the front side of the protective frame 42. As described above, the electrical component box 26 is protected by the protective frames 42 that stand erect on the rear frames 14 and the upper load transmitting members 43 that extend from the upper end portions of the protective frames 42 to the wheel housing reinforcing gussets 191 on the front side. This allows a decrease in the volume of the luggage compartment 11 to be suppressed and the electrical component box 26 to be protected.

Furthermore, as illustrated in FIG. 9, the engagement pin 195, which protrudes rearward from the rear surface of the wheel housing reinforcing gusset 191, is engaged with the positioning hole 146 of the upper load transmitting member 43, and, as illustrated in FIG. 10, the fastening extension 137 of the upper load transmitting member 43 is fastened to the inner side surface of the wheel housing reinforcing gusset 191. Thus, the upper load transmitting member 43 can be attached from the luggage compartment 11 or the vehicle cabin. This improves work efficiency in attaching the upper load transmitting member 43. The engagement pin 195, which protrudes rearward from the rear surface of the wheel housing reinforcing gusset 191, is engaged with the positioning hole 146 of the upper load transmitting member 43. Thus, a load can be stably transmitted from the upper load transmitting member 43 to the wheel housing reinforcing gusset 191.

Furthermore, as illustrated in FIG. 4, in the protective frame 42, the base member 52 is butt welded to the lower end portion of the protective frame main body 51 that extends in the up-down direction, and the base member 52 is connected to the reinforcing members 53 and 54 so as to surround the periphery of the lower end portion of the protective frame main body 51. Thus, a load transmitted to the lower portion can be reliably transmitted from the protective frame 42 to the rear frames 14.

The fastening seat 105 of the protective frame 42 is fastened to the upper surface of the rear frame 14 and the fastening seats 94 and 115 of the protective frame 42 are fastened to the inner side surface of the rear frame 14. Thus, fastening work is facilitated, and the protective frame 42 can be reliably fastened to the rear frames 14. Accordingly, a load transmitted to the lower portion can be stably transmitted from the protective frame 42 to the rear frames 14.

The rear frame 14 is clamped between the fastening seat 105 and the attachment stiffener 171 and between the fastening seat 94 and 115 and the attachment stiffener 171 provided in the rear frame 14 illustrated in FIG. 7 so as to allow the protective frame 42 to be fastened to the rear frame 14. Thus, the protective frame 42 can be reliably fastened to the rear frame 14. Accordingly, a load transmitted to the lower portion can be more reliably transmitted from the protective frame 42 to the rear frames 14.

As illustrated in FIG. 11, the protective frame 42 has the attachment seat 93 for the box frame 215 that supports the electrical component box 26. Thus, a load applied to the box frame 215 can be transmitted to the rear frame 14, and a separate bracket having the attachment seat 93 is not needed.

The protective frame 42, the box frame 215 which supports the electrical component box 26, and the inclined frame 45 which connects the upper end portion of the protective frame 42 and the box frame 215, form the truss structure in the vehicle width direction. Thus, inward or outward inclination of the protective frame 42 in the vehicle width direction can be suppressed with a small sized structure.

As illustrated in FIGS. 2 to 4, the end portion of the inclined frame 45 can be received by the recess 81 of the upper end portion of the protective frame 42. Thus, protrusion of the inclined frame 45 to the luggage compartment 11 can be suppressed, and accordingly, a decrease in the volume of the luggage compartment 11 can be suppressed.

Figure 16B:
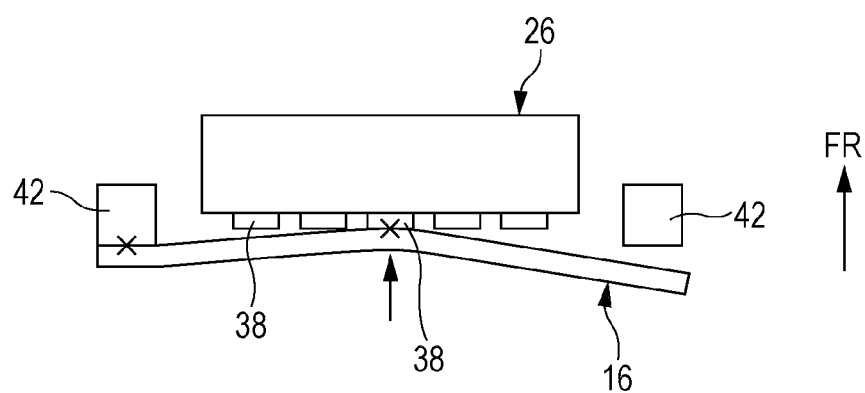
Figure 17:
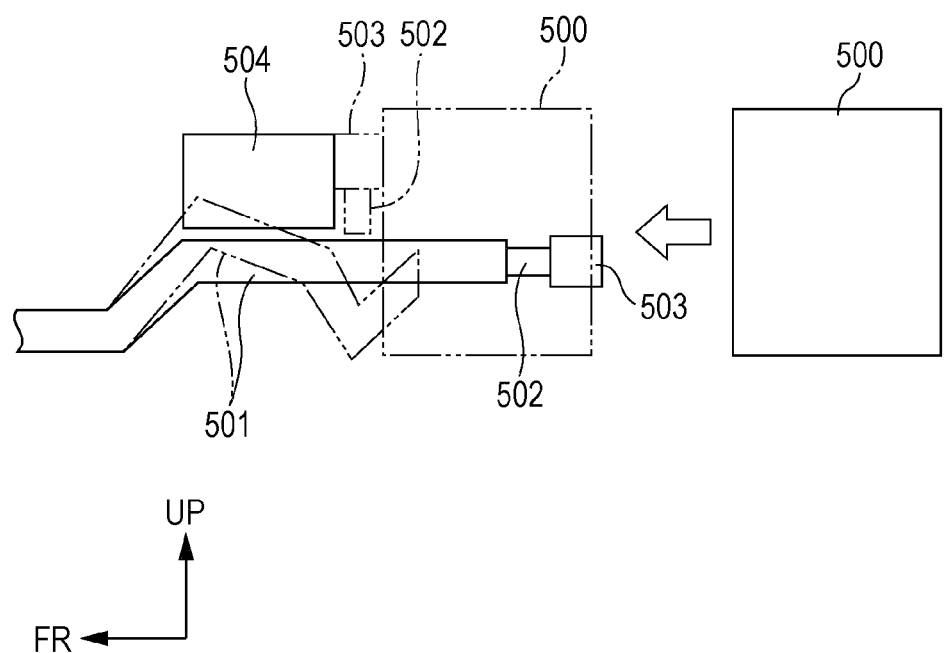
FIG. 17 is a side view generally illustrating an example of a state of the vehicle rear body structure in the case of a rear-end collision.

As illustrated in FIG. 16B, when the rear bumper beam 16 is bent in the case of a rear-end collision, the rear bumper beam 16 can be received by the reinforcing stiffeners 38 provided on the rear surface of the electrical component box 26 in addition to the protective frame 42. Thus, the electrical component box 26 can be protected.

As illustrated in FIG. 1, the electrical component box 26 is disposed on the box frame 215, which has the box lateral member 211 and the box longitudinal members 214. As illustrated in FIG. 1, the box lateral member 211 is provided, extending in the vehicle width direction, on the front portion of the luggage compartment 11 on the rear side of the rear seat 25. As illustrated in FIG. 11, the box longitudinal members 214 are provided between the box lateral member 211 and the rear cross member 212 on the front side thereof. Thus, the electrical component box 26 can be disposed in the most front portion of the luggage compartment 11. This allows the volume of the luggage compartment 11 to be increased.

As illustrated in FIG. 8, the wheel housing reinforcing gusset 191 together with the rear wheel housing 13 has a closed section that extends to a corner portion formed by the rear frame 14 and the rear wheel housing 13. Thus, the strength of the wheel housing reinforcing gusset 191 is improved.

As illustrated in FIG. 9, the engagement pin 195 that protrudes rearward from the overlapped portion 194 is engaged with the positioning hole 146 of the upper load transmitting member 43. The upper and lower gussets 192 and 193 of the wheel housing reinforcing gusset 191 are overlapped with each other in the overlapped portion 194, and the overlapped portion 194 has a high strength. In addition, as illustrated in FIG. 10, the fastening extension 137 is fastened to the overlapped portion 194, where the upper and lower gussets 192 and 193 are overlapped with each other and which has a high strength. Thus, a load can be stably transmitted from the upper load transmitting member 43 to the wheel housing reinforcing gusset 191.

As illustrated in FIGS. 2 and 3, the upper load transmitting member 43 has the upper load transmitting member main body 121 that has a hollow frame structure and the lid member 123 that is provided at the other end portion of the upper load transmitting member main body 121 and has the positioning hole 146. The lid member 123 is connected to the fastening extension 137. Thus, a load can be stably transmitted from the upper load transmitting member 43 to the wheel housing reinforcing gusset 191.

As illustrated in FIG. 12, the strength of the box lateral member 211 can be improved because of its closed sectional structure. Furthermore, as illustrated in FIG. 14, the box lateral member 211 is fastened to the rear frame 14 with the collar 236 clamped therebetween. Thus, the fastening strength can be improved. While some specific examples and embodiments are described above, it will be clear that the present disclosure is not limited to these specific examples and embodiments and that many changes and modified embodiments may be obvious to those skilled in the art.

We claim:

1. A vehicle rear body structure provided in a vehicle that includes an electrical component box disposed in front of a luggage compartment of the vehicle, the vehicle rear body structure comprising:
   a rear frame extending in a vehicle longitudinal direction and including an upper surface and an inner side surface;
   a wheel housing reinforcing gusset including a rear surface, an inner side surface, and an engagement pin protruding rearward from the rear surface thereof;
   a protective frame disposed and standing on the upper surface of the rear frame, positioned on a rear side of the electrical component box, and including an upper end portion; and
   an upper load transmitting member extending forward from the upper end portion of the protective frame to the wheel housing reinforcing gusset,
   wherein the upper load transmitting member includes a positioning hole receiving and engaged with the engagement pin of the wheel housing reinforcing gusset, and a fastening extension fastened to the inner side surface of the wheel housing reinforcing gusset, and
   wherein the protective frame includes:
   a protective frame main body extending in an up-down direction and including a lower end portion including a peripheral edge,
   a base member including an upper surface, the lower end portion of the protective frame main body being butt welded to the upper surface of the base member, and
   a reinforcing member connected to the peripheral edge of the lower end portion of the protective frame main body such that the reinforcing member surrounds the peripheral edge of the lower end portion of the protective frame main body.

2. The vehicle rear body structure according to claim 1, wherein the protective frame includes:
   a rear frame upper surface fastening seat fastened to the upper surface of the rear frame, and
   a rear frame inner side surface fastening seat fastened to the inner side surface of the rear frame.

3. The vehicle rear body structure according to claim 2, further comprising:
   an attachment stiffener disposed inside the rear frame, the attachment stiffener including a portion corresponding to and opposite to the rear frame upper surface fastening seat so as to clamp the rear frame with the rear frame upper surface fastening seat, and a portion corresponding to and opposite to the rear frame inner side surface fastening seat so as to clamp the rear frame with the rear frame inner side surface fastening seat.

4. The vehicle rear body structure according to claim 1, further comprising:
   a box frame extending in a vehicle transverse direction and supporting the electrical component box,
   wherein the protective frame includes an attachment seat to which the box frame is attached.

5. The vehicle rear body structure according to claim 1, further comprising:
   a box frame extending in a vehicle transverse direction and supporting the electrical component box; and
   an inclined frame connecting the upper end portion of the protective frame to the box frame,
   wherein the protective frame, the box frame, and the inclined frame form a truss structure in a vehicle width direction.

6. The vehicle rear body structure according to claim 5, wherein the protective frame has a recess at the upper end portion thereof, the recess receiving an end portion of the inclined frame.

7. A vehicle rear body structure provided in a vehicle that includes a rear seat, an electrical component box having a rear surface, a wheel housing, and a luggage compartment, the vehicle rear body structure comprising:
   a rear frame extending in a vehicle longitudinal direction and including an upper surface;
   a cross member extending in a vehicle transverse direction;
   a wheel housing reinforcing gusset reinforcing the wheel housing;
   a box frame supporting the electrical component box disposed thereon, the box frame including:
      a box lateral member extending in the vehicle transverse direction, disposed on a rear side of the rear seat and at a front portion of the luggage compartment, the box lateral member being disposed on an inner side of the rear frame in a vehicle width direction and connected to the rear frame at one end thereof, and
      a box longitudinal member extending in the vehicle longitudinal direction and disposed between the box lateral member and the cross member, the cross member being disposed in front of the box lateral member;
   a protective frame disposed and standing on the upper surface of the rear frame, positioned on a rear side of the electrical component box, and including an upper end portion including a front surface;
   an upper load transmitting member extending forward from the upper end portion of the protective frame to the wheel housing reinforcing gusset; and
   a reinforcing stiffener provided on the rear surface of the electrical component box,
   wherein the rear frame contacts the wheel housing to form a corner portion,
   wherein the wheel housing reinforcing gusset is attached to the wheel housing so as to form a closed section with the wheel housing, extends to the corner portion, and includes
      an upper gusset member and a lower gusset member, the upper gusset member and the lower gusset member being overlapped with each other to form an overlapped portion having a rear surface and a fastening portion, and
      an engagement pin disposed in the overlapped portion such that the engagement pin protrudes rearward from the rear surface of the overlapped portion, and
   wherein the upper load transmitting member includes a fastening extension fastened to the fastening portion of the overlapped portion, and a positioning hole receiving and engaged with the engagement pin.

8. The vehicle rear body structure according to claim 7, wherein the protective frame has a hollow frame structure, and
   wherein the upper load transmitting member has a hollow frame structure and includes:

an upper load transmitting member main body including one and the other end portions, the one end portion being connected to the front surface of the upper end portion of the protective frame, and a lid member provided at the other end portion of the upper load transmitting member main body, the lid member including the positioning hole formed therein, the lid member being connected to the fastening extension.

9. The vehicle rear body structure according to claim 7, wherein the box lateral member has a closed section, includes a collar at the one end thereof, and is fastened to the rear frame with the collar clamped therebetween.

10. A vehicle rear body structure provided in a vehicle that includes an electrical component box disposed in front of a luggage compartment of the vehicle, the vehicle rear body structure comprising:

a rear frame extending in a vehicle longitudinal direction and including an upper surface and an inner side surface;

a wheel housing reinforcing gusset including a rear surface, an inner side surface, and an engagement pin protruding rearward from the rear surface thereof;

a protective frame disposed and standing on the upper surface of the rear frame, positioned on a rear side of the electrical component box, and including an upper end portion; and an upper load transmitting member extending forward from the upper end portion of the protective frame to the wheel housing reinforcing gusset, wherein the upper load transmitting member includes a positioning hole receiving and engaged with the engagement pin of the wheel housing reinforcing gusset, and a fastening extension fastened to the inner side surface of the wheel housing reinforcing gusset, wherein the protective frame includes:
 a rear frame upper surface fastening seat fastened to the upper surface of the rear frame, and
 a rear frame inner side surface fastening seat fastened to the inner side surface of the rear frame, and wherein the vehicle rear body structure further comprises an attachment stiffener disposed inside the rear frame, the attachment stiffener including a portion corresponding to and opposite to the rear frame upper surface fastening seat so as to clamp the rear frame with the rear frame upper surface fastening seat, and a portion corresponding to and opposite to the rear frame inner side surface fastening seat so as to clamp the rear frame with the rear frame inner side surface fastening seat.

11. The vehicle rear body structure according to claim 10, further comprising:

a box frame extending in a vehicle transverse direction and supporting the electrical component box, wherein the protective frame includes an attachment seat to which the box frame is attached.

12. The vehicle rear body structure according to claim 10, further comprising:

a box frame extending in a vehicle transverse direction and supporting the electrical component box; and an inclined frame connecting the upper end portion of the protective frame to the box frame, wherein the protective frame, the box frame, and the inclined frame form a truss structure in a vehicle width direction.

13. The vehicle rear body structure according to claim 12, wherein the protective frame has a recess at the upper end portion thereof, the recess receiving an end portion of the inclined frame.

14. A vehicle rear body structure provided in a vehicle that includes an electrical component box disposed in front of a luggage compartment of the vehicle, the vehicle rear body structure comprising:

a rear frame extending in a vehicle longitudinal direction and including an upper surface and an inner side surface;

a wheel housing reinforcing gusset including a rear surface, an inner side surface, and an engagement pin protruding rearward from the rear surface thereof;

a protective frame disposed and standing on the upper surface of the rear frame, positioned on a rear side of the electrical component box, and including an upper end portion; and an upper load transmitting member extending forward from the upper end portion of the protective frame to the wheel housing reinforcing gusset;

a box frame extending in a vehicle transverse direction and supporting the electrical component box; and an inclined frame connecting the upper end portion of the protective frame to the box frame, wherein the upper load transmitting member includes a positioning hole receiving and engaged with the engagement pin of the wheel housing reinforcing gusset, and a fastening extension fastened to the inner side surface of the wheel housing reinforcing gusset, and wherein the protective frame, the box frame, and the inclined frame form a truss structure in a vehicle width direction.

15. The vehicle rear body structure according to claim 14, wherein the protective frame includes:

a protective frame main body extending in an up-down direction and including a lower end portion including a peripheral edge, a base member including an upper surface, the lower end portion of the protective frame main body being butt welded to the upper surface of the base member, and a reinforcing member connected to the peripheral edge of the lower end portion of the protective frame main body such that the reinforcing member surrounds the peripheral edge of the lower end portion of the protective frame main body.

16. The vehicle rear body structure according to claim 14, wherein the protective frame includes:

a rear frame upper surface fastening seat fastened to the upper surface of the rear frame, and a rear frame inner side surface fastening seat fastened to the inner side surface of the rear frame.

17. The vehicle rear body structure according to claim 14, further comprising:

a box frame extending in a vehicle transverse direction and supporting the electrical component box, wherein the protective frame includes an attachment seat to which the box frame is attached.

18. The vehicle rear body structure according to claim 14, wherein the protective frame has a recess at the upper end portion thereof, the recess receiving an end portion of the inclined frame.

* * * * *